United States Patent
Kazerooni

(10) Patent No.: US 7,810,790 B2
(45) Date of Patent: *Oct. 12, 2010

(54) VEHICLE WITH ON-BOARD CARGO HANDLING SYSTEM

(76) Inventor: Homayoon Kazerooni, 2806 Ashby Ave., Berkeley, CA (US) 94705

( * ) Notice: Subject to any disclaimer, the term of this patent is extended or adjusted under 35 U.S.C. 154(b) by 322 days.

This patent is subject to a terminal disclaimer.

(21) Appl. No.: 11/894,884

(22) Filed: Aug. 22, 2007

(65) Prior Publication Data

US 2007/0290180 A1    Dec. 20, 2007

Related U.S. Application Data

(63) Continuation-in-part of application No. 10/885,693, filed on Jul. 8, 2004, now Pat. No. 7,334,776.

(51) Int. Cl.
*B66D 1/00* (2006.01)
*B60R 9/06* (2006.01)

(52) U.S. Cl. .................... 254/270; 254/266; 414/540; 414/466; 212/180

(58) Field of Classification Search ............... 254/270, 254/266, 264, 274, 331, 360–362; 414/540, 414/563, 462, 466, 467, 2–5; 212/285, 231, 212/180; 224/310
See application file for complete search history.

(56) References Cited

U.S. PATENT DOCUMENTS

| | | | |
|---|---|---|---|
| 2,989,288 A | 6/1961 | Smith | |
| 3,921,959 A | 11/1975 | Ulbing | |
| 3,933,388 A | 1/1976 | Conboy | |
| 3,940,110 A | 2/1976 | Motoda | |
| 4,073,395 A | 2/1978 | Clement | |
| 4,221,528 A | 9/1980 | Gordos | |
| 4,391,379 A | 7/1983 | Paffrath | |
| 4,557,659 A | 12/1985 | Scaglia | |
| 4,573,854 A | 3/1986 | McFarland | |
| 4,604,022 A | 8/1986 | Bourgraf | |
| 4,616,972 A | 10/1986 | McFarland | |
| 4,685,860 A | 8/1987 | McFarland | |
| 4,799,849 A | 1/1989 | Miller | |
| 4,844,421 A | 7/1989 | Kojima | |
| 4,858,981 A | 8/1989 | Post | |
| 4,917,360 A | 4/1990 | Kojima | |
| 4,969,793 A | 11/1990 | Pawl | |
| 5,139,156 A | 8/1992 | Nakamura | |
| 5,195,726 A | 3/1993 | Kaner | |
| 5,270,621 A | 12/1993 | Kiiski | |

(Continued)

OTHER PUBLICATIONS

Kazerooni, H. "Human-Robot Interaction via the Transfer of Power and Information Signals," IEEE Transactions on Systems and Cybernetics, V20, N2, pp. 450-463, Apr. 1990.

(Continued)

*Primary Examiner*—Evan H Langdon

(57) ABSTRACT

A vehicle, configured to transport an object, said vehicle among other components, comprising: a load bearing member; a line; an actuator coupled to said vehicle and adapted for applying a tensile force to said line in response to an actuator command, and disposed and adapted for transmitting at least a portion of said tensile force to said load bearing member; an end-effector mechanically coupled to said line and adapted for transmitting said tensile force and an operator force to said object and for generating an operator input signal; and a controller adapted for generating said actuator command from said operator input signal.

65 Claims, 30 Drawing Sheets

U.S. PATENT DOCUMENTS

| | | |
|---|---|---|
| 5,350,075 A | 9/1994 | Kahlman |
| 5,388,289 A | 2/1995 | Casperson |
| 5,437,432 A | 8/1995 | Fujikawa |
| 5,480,125 A | 1/1996 | Bitsch et al. |
| 5,551,308 A | 9/1996 | Arai et al. |
| 5,632,469 A | 5/1997 | Heun et al. |
| 5,671,912 A | 9/1997 | Langford |
| 5,707,094 A | 1/1998 | Gower |
| 5,765,987 A | 6/1998 | Zimmerrma |
| 5,850,928 A | 12/1998 | Kahlman et al. |
| 5,865,426 A | 2/1999 | Kazerooni |
| 5,915,673 A | 6/1999 | Kazerooni |
| 6,138,991 A | 10/2000 | Myers, Jr. |
| 6,152,675 A | 11/2000 | Compton |
| 6,299,139 B1 | 10/2001 | Kazerooni |
| 6,386,513 B1 | 5/2002 | Kazerooni |
| 6,554,252 B2 | 4/2003 | Kazerooni |
| 6,622,990 B2 | 9/2003 | Kazerooni |
| 7,334,776 B2 * | 2/2008 | Kazerooni .................. 254/270 |
| 2006/0151765 A1 * | 7/2006 | Kazerooni .................. 254/275 |

OTHER PUBLICATIONS

Kazerooni, H. Mahoney, S., "Dynamics and Control of Robotic Systems Worn By Humans," ASME J. of Dynamic Systems, Measurement, and Control, V113, N3, p. 379-387, Sep. 1991.

Kazerooni, H., "The Human Power Amplifier Technology at the University of California, Berkeley", J. of Robotics and Autonomous Systems, Elsevier, V19, pp. 179-187, 1996.

Kazerooni, H., and Guo, J., "Human Extenders," ASME Journal of Dynamic Systems, Measurement, and Control, V115, N2(B), pp. 281-289, Jun. 1993.

Kazerooni, H., Her, M. G., "The Dynamics and Control of a Haptic Interface Device," IEEE Trans. on Robotics and Automation, V10, N4, pp. 453-464, Aug. 1994.

Kazerooni, H., Snyder, T. J. "A Case Study on Dynamics of Haptic Devices: Human Induced Instability" AIAA J. of Guidance, Control, and Dynamics, V18, N1, pp. 108-113, 1995.

* cited by examiner

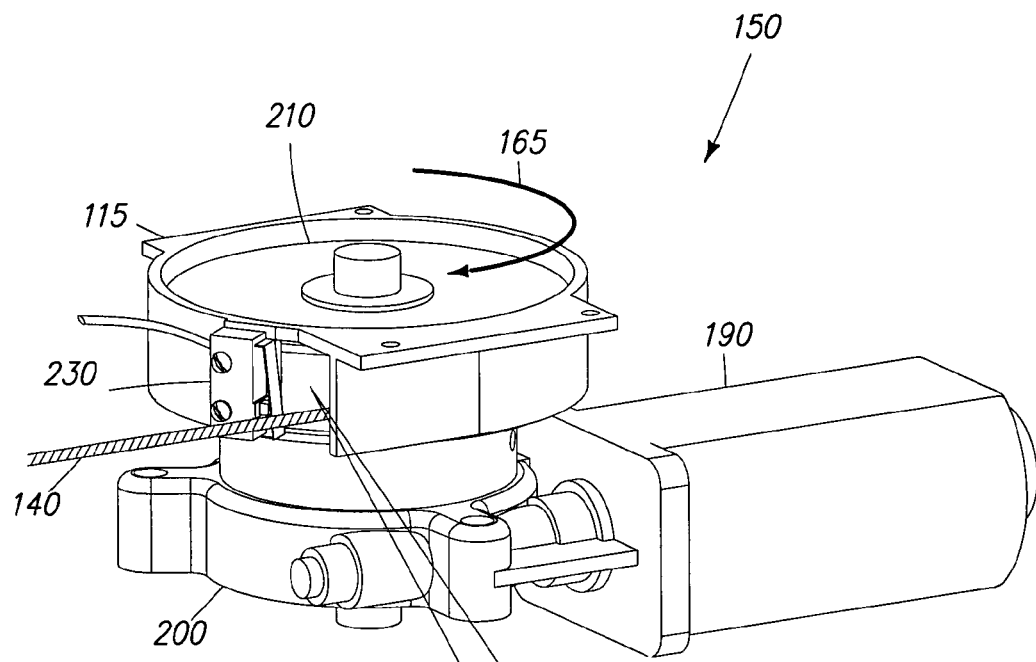
Fig. 5
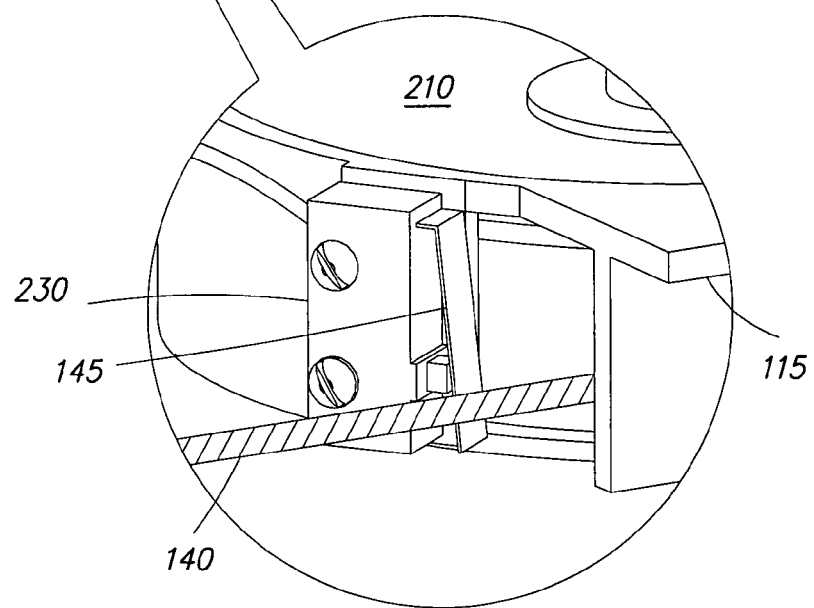

| Row Numbers | Sign of ($f_m$-$f_o$) | Slack Sensor<br><br>1=line is taut<br>0=line is slack | Upper Limit Sensor<br><br>0=Actiavted<br>1=Not Activated | Lower Limit Sensor<br><br>0=Actiavted<br>1=Not Activated | Amplifier Command Signal |
|---|---|---|---|---|---|
| 1 | $f_m$-$f_o$>0 | 0 | 1 | 1 | e = 0 |
| 2 | $f_m$-$f_o$>0 | 0 | 1 | 0 | e = 0 |
| 3 | $f_m$-$f_o$>0 | 0 | 0 | 1 | e=K ($f_m$-$f_o$) |
| 4 | $f_m$-$f_o$>0 | 1 | 1 | 1 | e=K ($f_m$-$f_o$) |
| 5 | $f_m$-$f_o$>0 | 1 | 1 | 0 | e = 0 |
| 6 | $f_m$-$f_o$>0 | 1 | 0 | 1 | e=K ($f_m$-$f_o$) |
| 7 | $f_m$-$f_o$<0 | 0 | 1 | 1 | e=K ($f_m$-$f_o$) |
| 8 | $f_m$-$f_o$<0 | 0 | 1 | 0 | e=K ($f_m$-$f_o$) |
| 9 | $f_m$-$f_o$<0 | 0 | 0 | 1 | e = 0 |
| 10 | $f_m$-$f_o$<0 | 1 | 1 | 1 | e=K ($f_m$-$f_o$) |
| 11 | $f_m$-$f_o$<0 | 1 | 1 | 0 | e=K ($f_m$-$f_o$) |
| 12 | $f_m$-$f_o$<0 | 1 | 0 | 1 | e = 0 |

Fig. 26

VEHICLE WITH ON-BOARD CARGO HANDLING SYSTEM

REFERENCE TO RELATED APPLICATIONS

This application is a CIP of U.S. application Ser. No. 10/885,693, filed on Jul. 8, 2004. The examiner is Mr. Evan Langdon. The art unit is 3654.

BACKGROUND

The present invention relates generally to the field of cargo handling systems for vehicles such as sport utility vehicles, minivans, buses and trucks. More specifically this invention relates to the field of powered cargo handling systems utilizing either the vehicle roof, vehicle ceiling, or the vehicle rear door (hatch) for support.

In a wide variety of situations, people of ordinary ability are often frustrated in attempting to load excessively heavy or bulky cargo into their vehicle cargo space. Conventional devices to assist in cargo handling tend to occupy too much space, to be too complicated to use, and to operate too slowly for wide acceptance by the general public. Consequently, vehicle manufacturers have usually declined to offer such conventional cargo handling devices as original equipment on their products. While manufacturers of vehicle after-market equipment do offer some lifting devices, these after-market devices are traditionally special purpose machines customized for lifting only scooters or wheelchairs for physically challenged individuals.

Opportunities exist, therefore, to create a vehicle that includes a compact, easy-to-operate, fast, and general purpose vehicle cargo handling system.

SUMMARY

The opportunities described above are addressed in one embodiment of the present invention by a vehicle configured to transport an object, the vehicle comprising: a load bearing member, a line, an actuator coupled to said vehicle adapted for applying a tensile force to the line in response to an actuator command and disposed and adapted for transmitting at least a portion of the tensile force to a load bearing member, an end-effector mechanically coupled to the line and adapted for transmitting the tensile force to the object and for generating an operator input signal, and a controller adapted for generating the actuator command from the operator input signal.

DRAWINGS

These and other features, aspects, and advantages of the present invention will become better understood when the following detailed description is read with reference to the accompanying drawings in which like characters represent like parts throughout the drawings, wherein:

FIG. 5 is a perspective drawing in accordance with an embodiment of the actuator.

FIG. 26 is a table in accordance with an embodiment of the logical performance of the invention.

DETAILED DESCRIPTION

Figure 1:
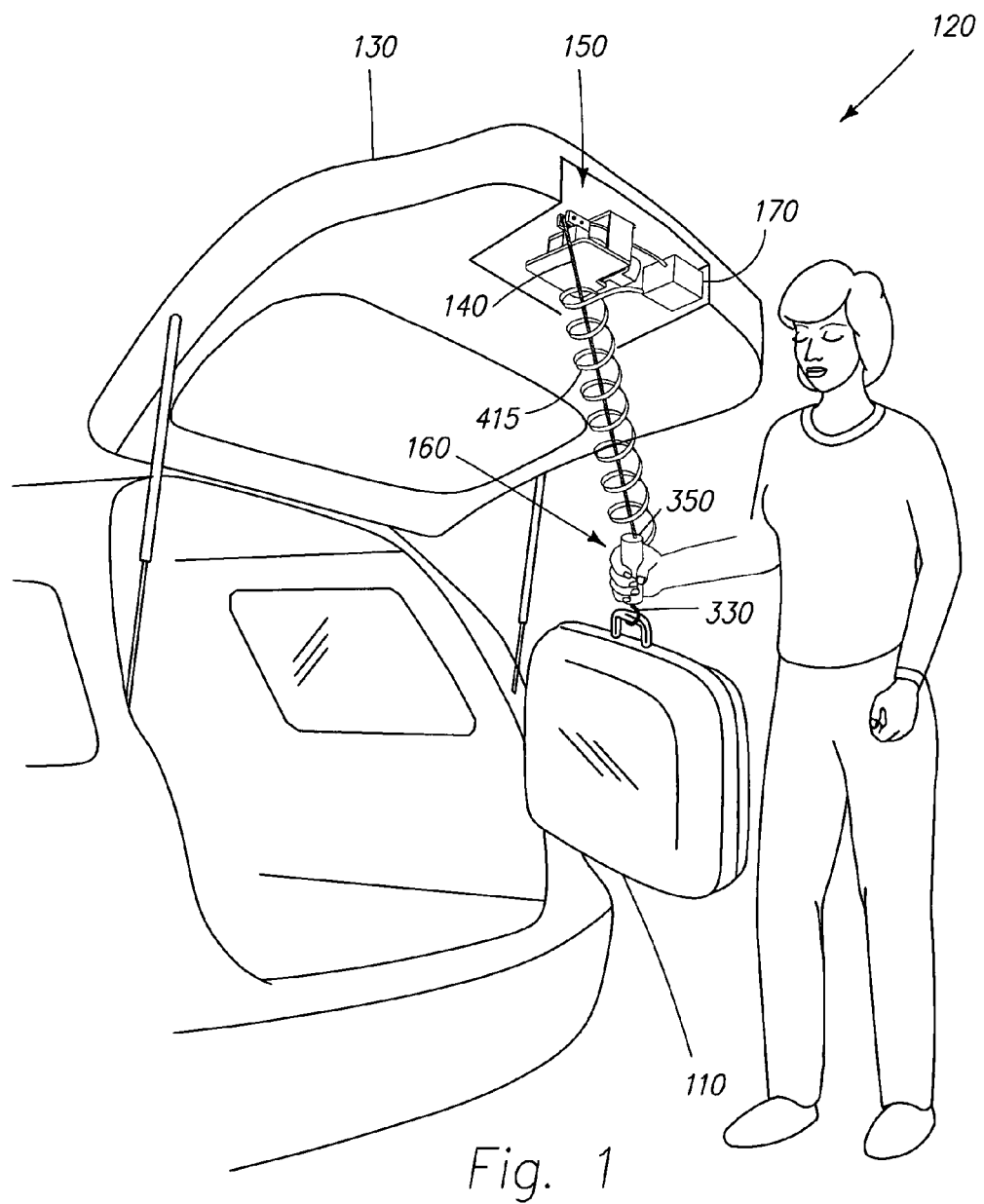
FIG. 1 is a perspective drawing in accordance with an embodiment of the present invention.

In accordance with an embodiment of the present invention, FIG. 1 is a perspective drawing illustrating a vehicle 120 which is configurable to transport an object 110. Vehicle 120 has a load bearing member 130. Vehicle 120, among other components, comprises a line 140, an actuator 150, an end-effector 160, and a controller 170. In operation, actuator 150 applies a tensile force to line 140 in response to an actuator command, and is disposed so as to transmit at least a portion of the tensile force to load bearing member 130. End-effector 160 is mechanically coupled to line 140 and transmits the tensile force and an operator force to object 110 and also generates an operator input signal. From the operator input signal, controller 170 generates the actuator command.

Figure 2:
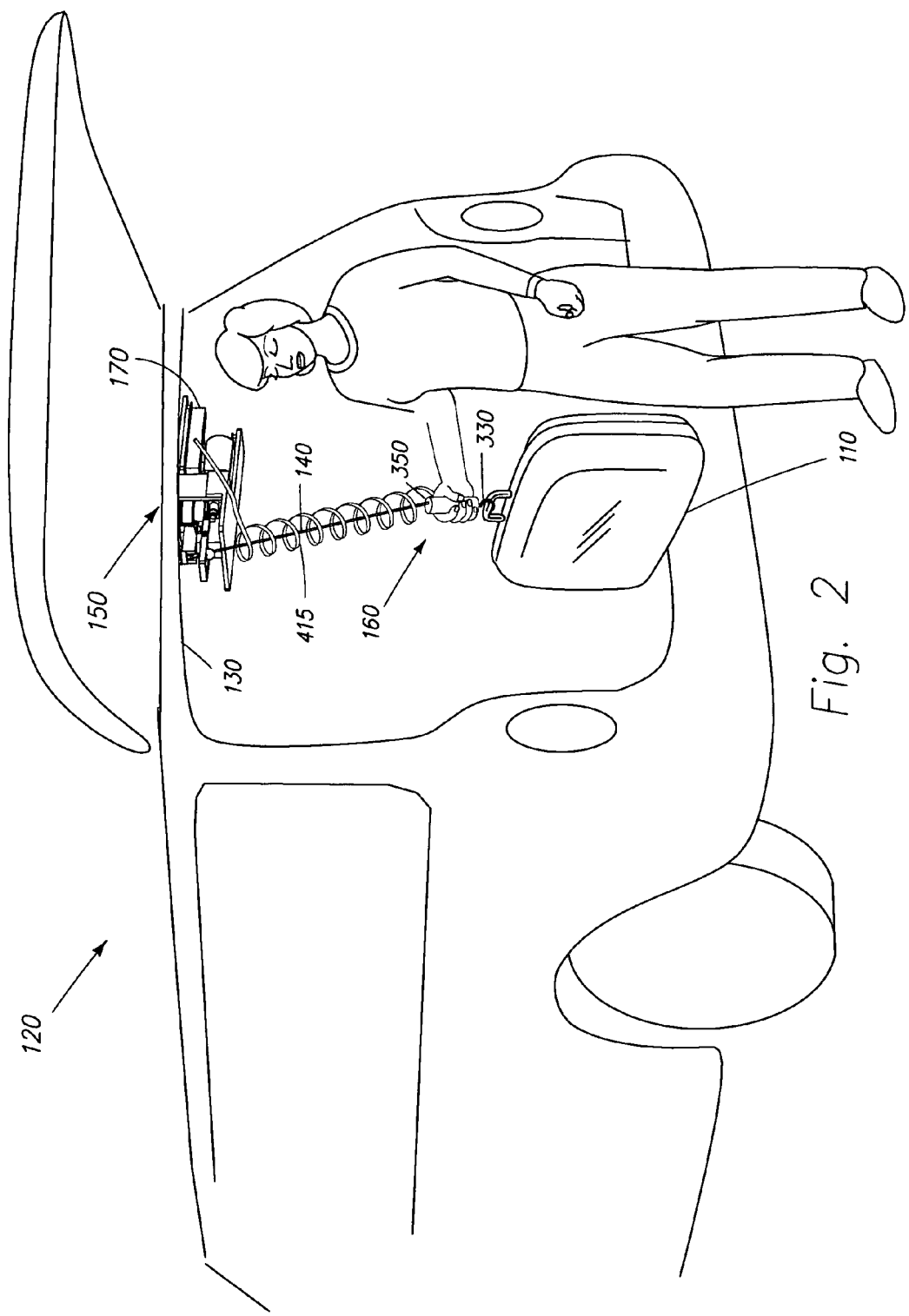
FIG. 2 is a perspective drawing in accordance with another embodiment of the present invention.

In some embodiments load bearing member 130 is a vehicle rear door (hatch) as shown in FIG. 1. In some embodiments, as shown in FIG. 2, load bearing member 130 is the vehicle ceiling. In some embodiments, load bearing member 130 is the vehicle roof. In some embodiments, load bearing member 130 is the vehicle trunk lid.

In some embodiments vehicle 120 is a sport utility vehicle. In some embodiments vehicle 120 is a minivan. In some embodiments vehicle 120 is a van. In some embodiments, vehicle 120 is a truck. In some embodiments, vehicle 120 is a sedan. In some embodiments, vehicle 120 is a bus.

Line 140 comprises any device or combination of devices capable of performing the indicated functions. Examples of line 140 include, without limitation, rope, wire, cable, belts, synthetic rope, fabric rope, plastic rope, wire rope, cord, twine, chain, bicycle-type chain, string, and combinations thereof. In some embodiments, line 140 comprises a multi-strand rope having a maximum strength greater than about 300 pounds. In some embodiments, line 140 comprises a multi-strand wire rope having a maximum strength of about 300 pounds. In some embodiments line comprises a set of linkages, joints or sliders.

Examples of object 110 include without limitation, suitcases, luggage, baggage, grocery bags, spare tires, food containers, sacks, backpacks, water jugs, tool boxes, beverage containers, barrels, and golf bags.

In some embodiments, a signal wire 415 transmits the operator input signal to controller 170. In accordance with another embodiment of the invention, end-effector 160 is further adapted for wirelessly transmitting the operator input signal to controller 170.

Figure 3:
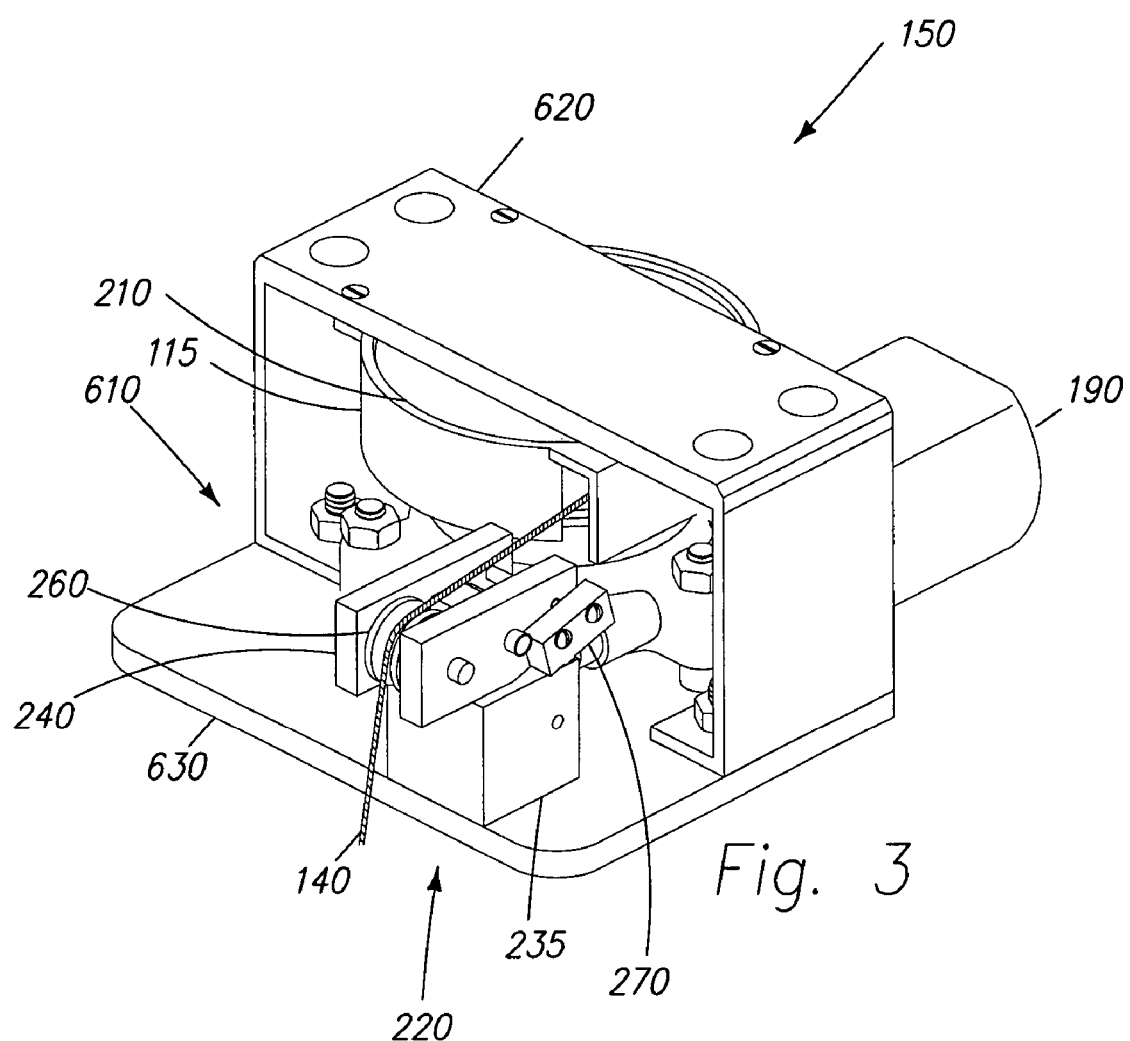
FIG. 3 is a perspective drawing in accordance with an embodiment of the actuator.
Figure 4:
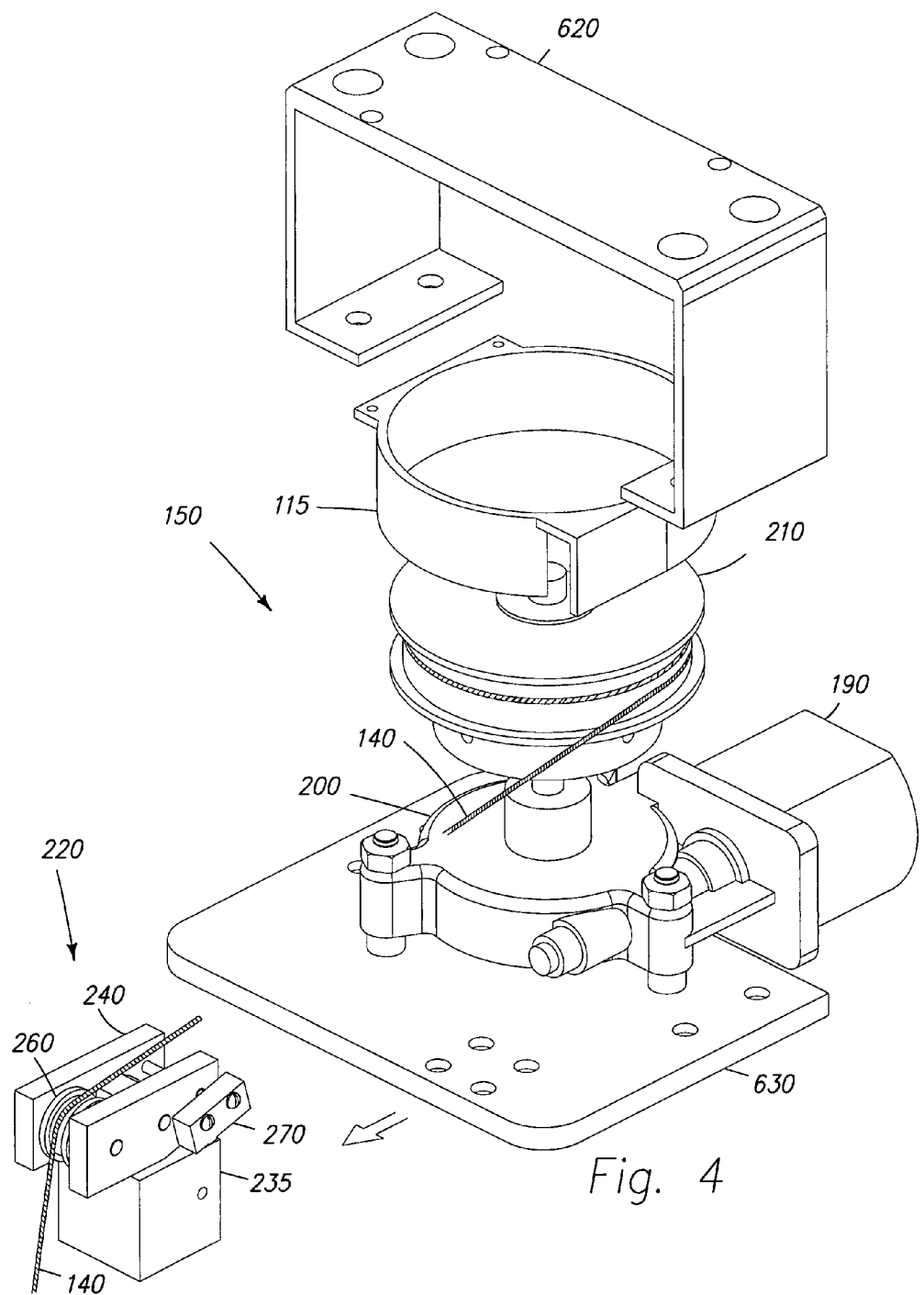
FIG. 4 is an exploded perspective drawing in accordance with the embodiment of FIG. 3.

In accordance with a more detailed embodiment of the embodiment of FIG. 1, FIG. 3 is a perspective drawing wherein actuator 150 comprises a motor 190 and a take-up pulley 210. FIG. 4 is an exploded view of FIG. 3. In operation, motor 190 generates a motor torque in response to the actuator command while take-up pulley 210 receives the motor torque and applies a tensile force to line 140.

In accordance with a more detailed embodiment of actuator 150, actuator 150 further comprises a mounting frame 610 connectable to load bearing member 130 and for transmitting at least a portion of the tensile force in line 140 to load bearing member 130. In a more detailed embodiment, mounting frame 610 comprises an upper mounting frame 620 and a lower mounting frame 630.

Motor 190 comprises any device or combination of devices capable of performing the indicated functions. Examples of motor 190 include, without limitation, hydraulic motors, pneumatic motors, and electric motors, including, without limitation, AC (alternating current) motors, brush-type DC (direct current) motors, brushless DC motors, electronically commutated motors (ECMs), stepping motors, and combinations thereof.

Take-up pulley 210 comprises any device or combination of devices capable of performing the indicated functions. Examples of take-up pulley 210 include, without limitation, drums, winches, single-groove pulleys, multi-groove pulleys, and combinations thereof. In some embodiments, actuator 150 further comprises an optional pulley cover 115 wrapped around take-up pulley 210 to ensure that line 140 will not come off the pulley groove.

In some embodiments, actuator 150 further comprises a transmission 200 mechanically coupled between motor 190 and take-up pulley 210. Transmission 200 comprises any device or combination of devices capable of performing the indicated functions. Examples of transmission 200 include, without limitation, gear trains, worm gears, bevel gears, planetary gears, pulleys, lines, belts, toothed belts, toothed pulleys, harmonic drives, and combinations thereof.

In accordance with another embodiment of the invention, FIG. 5 is a perspective drawing wherein actuator 150 further comprises a lower limit sensor 230. In operation, lower limit sensor 230 generates a lower limit signal when end-effector 160 reaches a prescribed lower limit position. In this embodiment, controller 170 generates the actuator command from the lower limit signal and from the operator input signal.

Lower limit sensor 230 comprises any device or combination of devices capable of performing the indicated functions. Examples of lower limit sensor 230 include, without limitation, switches and sensors or pick-ups capable of sensing the proximity of line 140 by magnetic, electrical, or optical means or combinations thereof.

Figure 6:
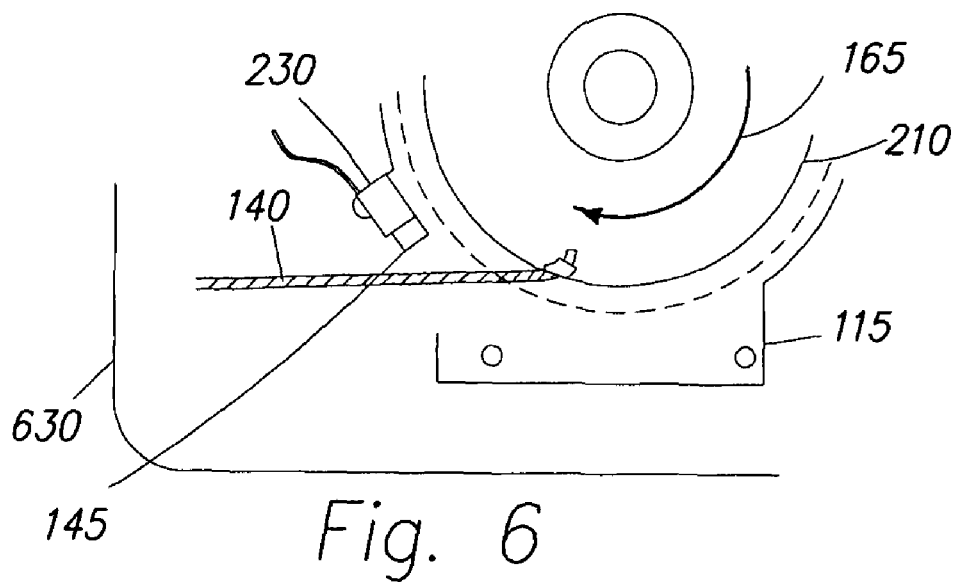
FIG. 6 is an orthographic drawing in accordance with a configuration of the embodiment of FIG. 5.
Figure 7:
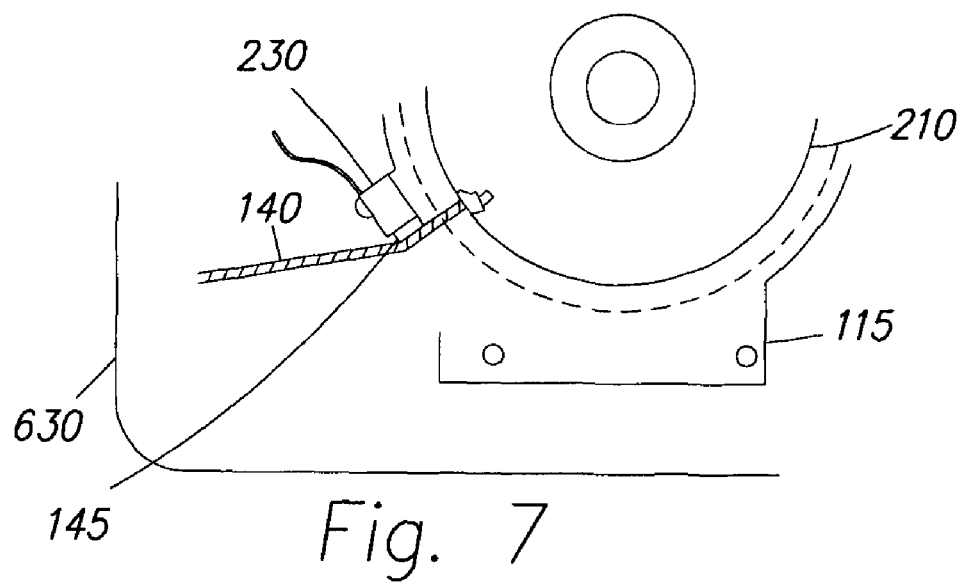
FIG. 7 is another orthographic drawing in accordance with another configuration of the embodiment of FIG. 5.

In some embodiments, lower limit sensor 230 comprises a limit switch including a switch lever 145. When take-up pulley 210 turns along arrow 165 and line 140 pushes switch lever 145, lower limit sensor 230 generates the lower limit signal. FIG. 6 shows actuator 150 just before lower limit sensor 230 is activated; FIG. 7 shows actuator 150 just after lower limit sensor 230 is activated.

Figure 8:
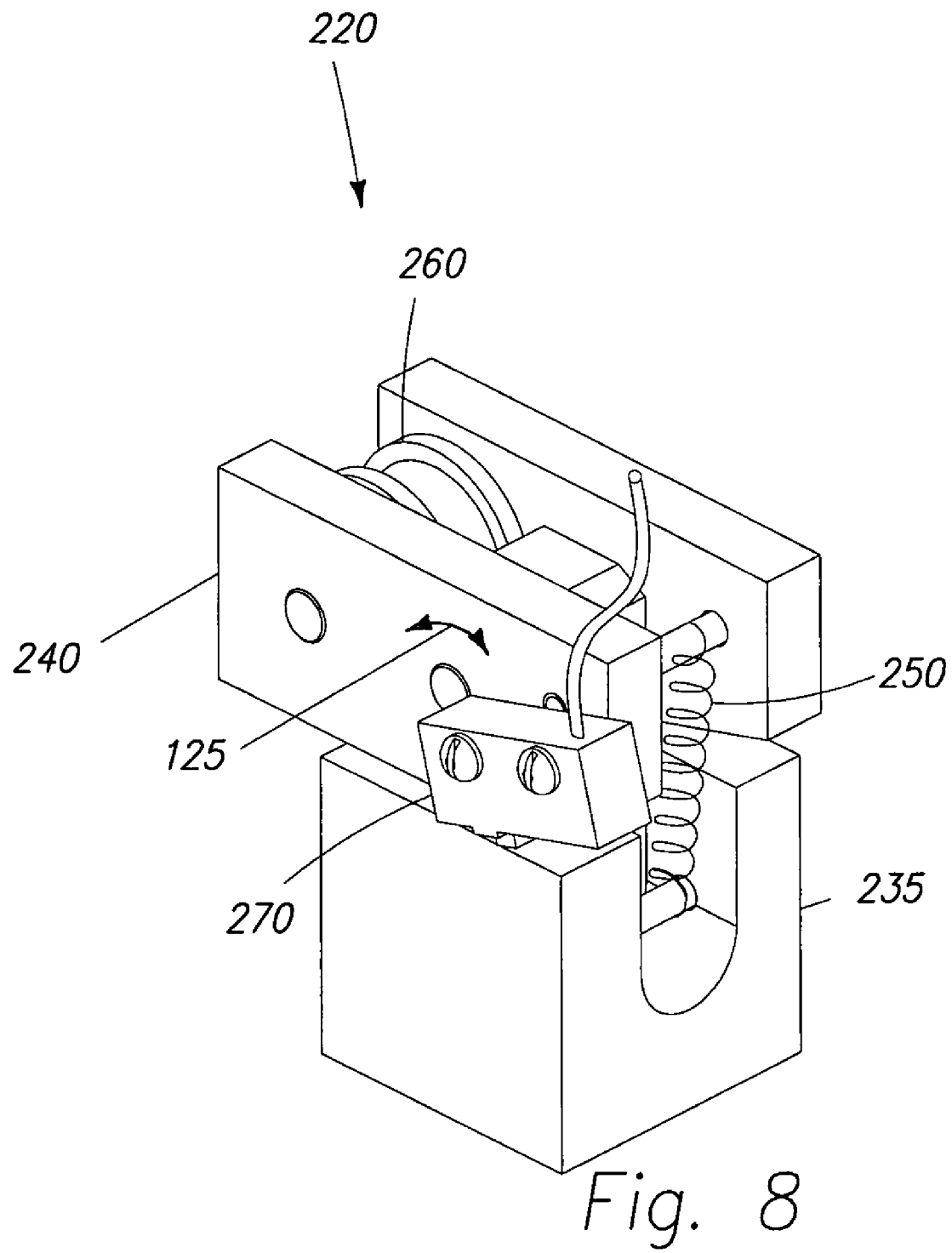
FIG. 8 is a perspective drawing in accordance with a more detailed embodiment of the embodiment of FIG. 3.

In accordance with a more detailed embodiment of the invention, FIG. 8 is a perspective drawing wherein actuator 150 further comprises a slack sensor 220. In operation, slack sensor 220 generates a slack signal when line 140 becomes slack (i.e., when the tension in line 140 drops below a desired level). In some embodiments, slack sensor 220 also redirects line 140. Controller 170 generates the actuator command from the slack signal and from the operator input signal. Slack sensor 220 comprises any device or combination of devices capable of performing the indicated function.

In accordance with a more detailed embodiment, slack sensor 220 further comprises a base block 235, an upper assembly 240, a line guide 260, a bias spring 250, and a load sensor 270. Upper assembly 240 is rotatably coupled to (i.e., coupled to permit rotation with respect to) base block 235 and, in operation, rotates with respect to base block 235 along arrow 125 as a function of line tension in line 140. Line guide 260 is rotatably coupled to upper assembly 240 and redirects line 140. Mechanically coupled between upper assembly 240 and base block 235, bias spring 250 exerts a bias force on upper assembly 240. When line tension is insufficient to overcome the bias force, load sensor 270 generates the slack signal. In the embodiment of FIG. 8, load sensor 270 is mechanically coupled to upper assembly 240.

Figure 9:
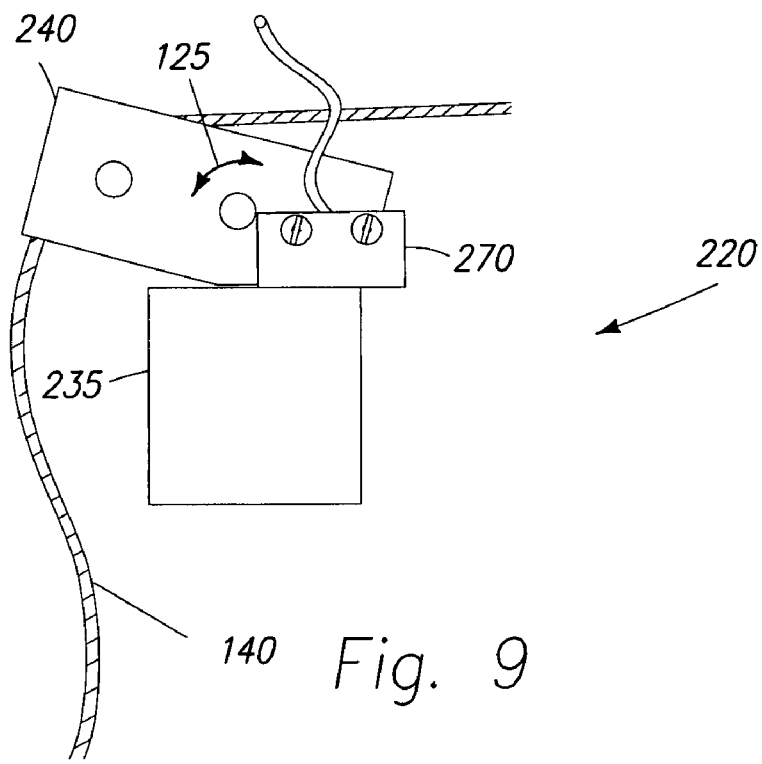
FIG. 9 is an orthographic drawing in accordance with another configuration of the embodiment of FIG. 8.
Figure 10:
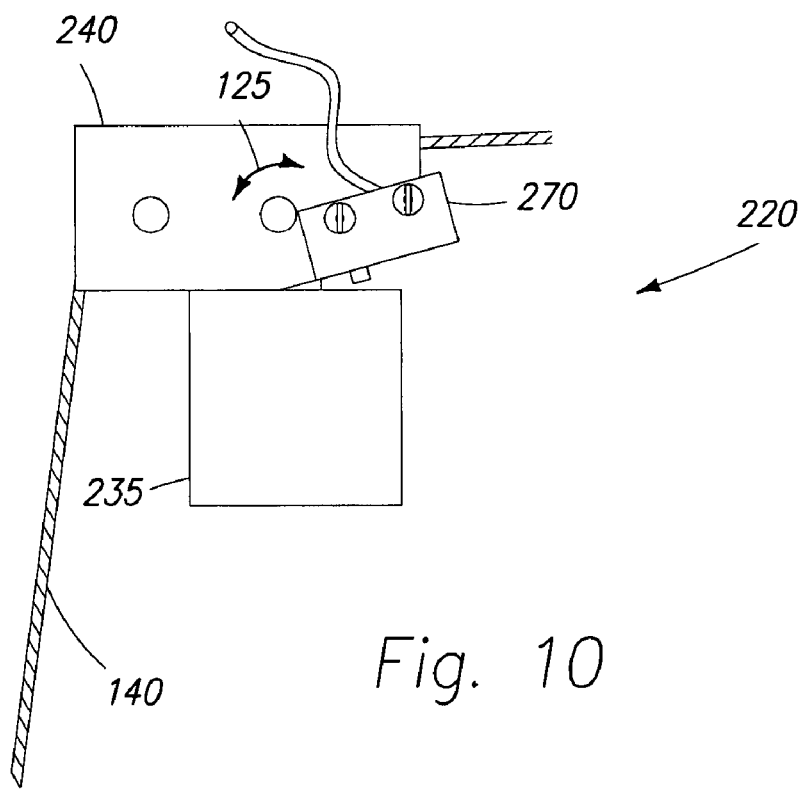
FIG. 10 is another orthographic drawing in accordance with another configuration of the embodiment of FIG. 8.

In some embodiments, load sensor 270 is a limit switch. When line tension is insufficient to overcome the bias force, load sensor 270 encounters base block 235 and generates the slack signal as shown in FIG. 9. FIG. 10 shows the configuration where the line is taut.

Figure 11:
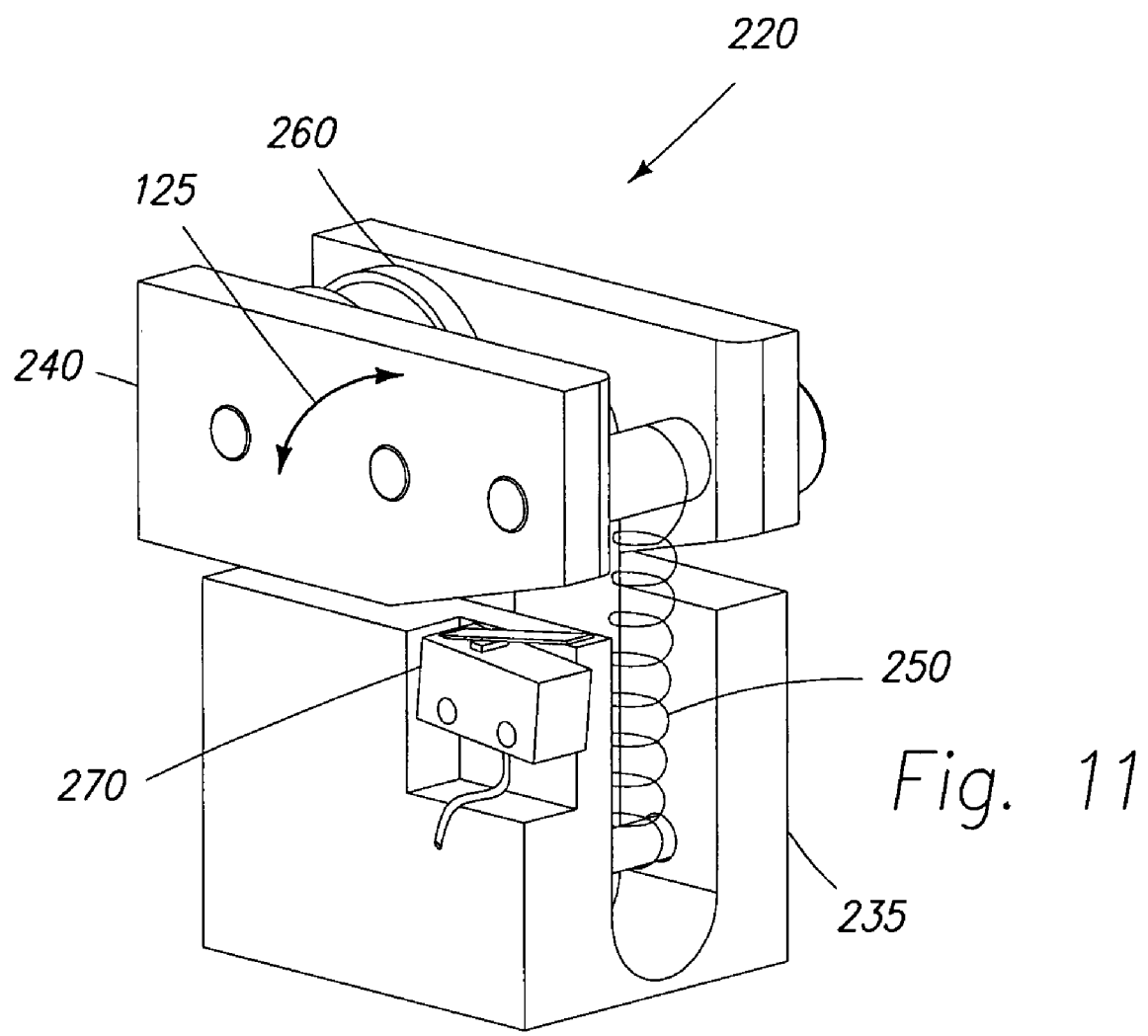
FIG. 11 is a perspective drawing in accordance with another more detailed embodiment of the embodiment of FIG. 3.

In accordance with another more detailed embodiment of the embodiment of FIG. 3, FIG. 11 is a perspective drawing wherein load sensor 270 is mechanically coupled to base block 235.

Load sensor 270 comprises any device or combination of devices capable of performing the indicated functions. Examples of load sensor 270 include, without limitation, switches and sensors or pick-ups capable of sensing the proximity of upper assembly 240 to base block 235 by magnetic, electrical, or optical means or combinations thereof.

Line guide 260 comprises any device or combination of devices capable of performing the indicated functions. Examples of line guide 260 include, without limitation, pulleys, sprockets, dowels, sleeves, channels, and combinations thereof.

Figure 12:
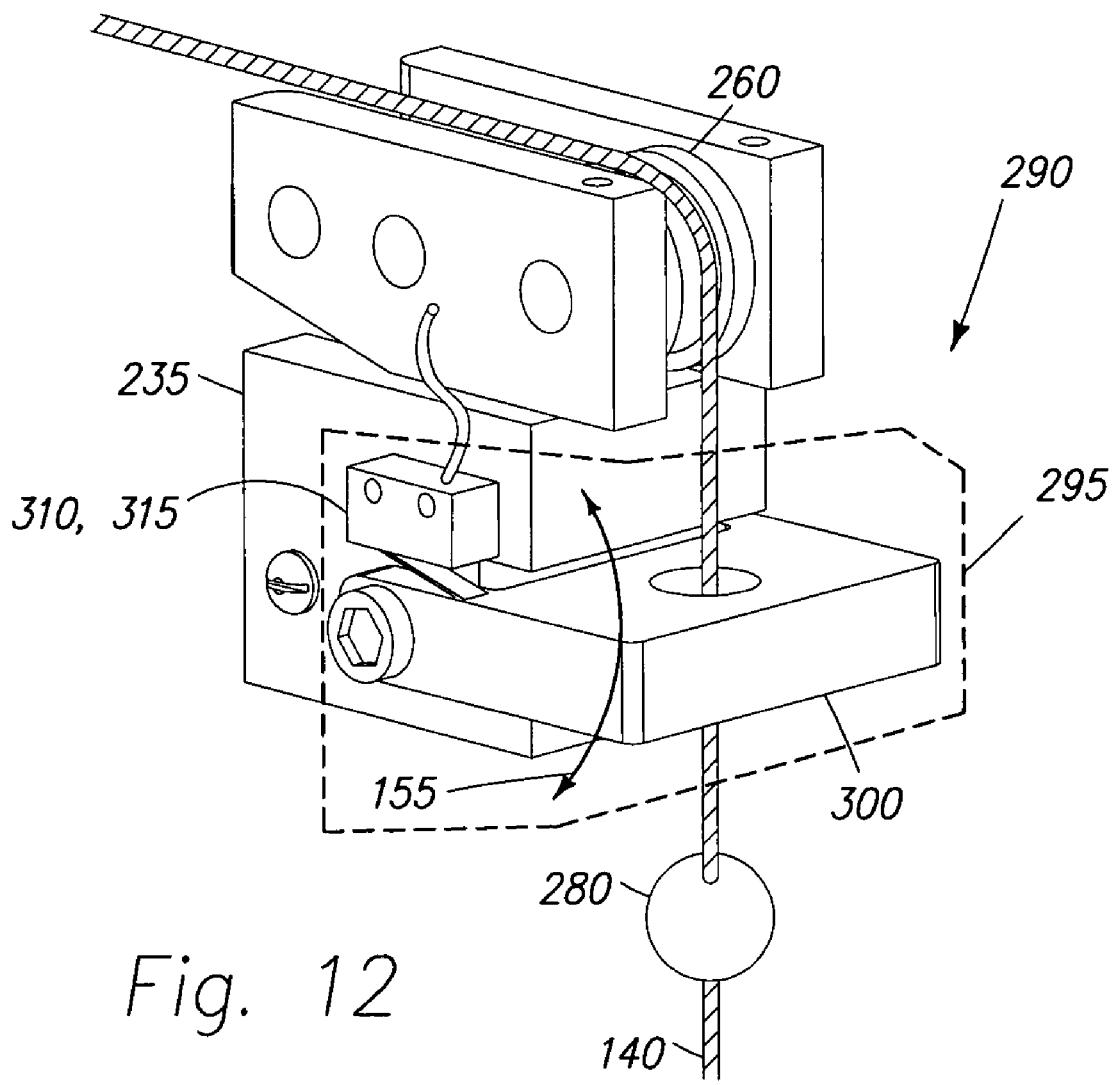
FIG. 12 is a perspective drawing in accordance with another more detailed embodiment of the embodiment of FIG. 3.

In accordance with another more detailed embodiment of the invention, FIG. 12 is a perspective drawing wherein actuator 150 further comprises an upper limit sensor 290. In operation, upper limit sensor 290 generates an upper limit signal when end-effector 160 (or line 140) reaches a prescribed upper limit position.

In accordance with another more detailed embodiment of the invention, upper limit sensor 290 comprises an upper limit marker 280 and a marker detector 295. Upper limit marker 280 is mechanically coupled to line 140. In operation, marker detector 295 generates an upper limit signal when upper limit marker 280 reaches the prescribed upper limit position.

In some embodiments, upper limit marker 280 comprises a rubbery object.

Marker detector 295 comprises any device or combination of devices capable of performing the indicated function. Examples of marker detector 295 include, without limitation, switches and sensors or pick-ups capable of sensing the proximity of upper limit marker 280 by magnetic, electrical, or optical means or combinations thereof.

In accordance with a more detailed embodiment, marker detector 295 comprises an upper limit bracket 300 and a contact sensor 310. Line 140 passes through an opening in upper limit bracket 300. The opening is shaped so as to prevent upper limit marker 280 from passing through. In operation, contact sensor 310 generates the upper limit signal as a function of a contact force between upper limit marker 280 and upper limit bracket 300.

In a more detailed embodiment, marker detector 295 further comprises a base block 235 and contact sensor 310 comprises a limit switch 315. Upper limit bracket 300 is rotatably coupled to base block 235 allowing motion along arrow 155. In operation, limit switch 315 generates an upper limit signal when the contact force causes sufficient rotation of upper limit bracket 300 with respect to base block 235.

Figure 13:
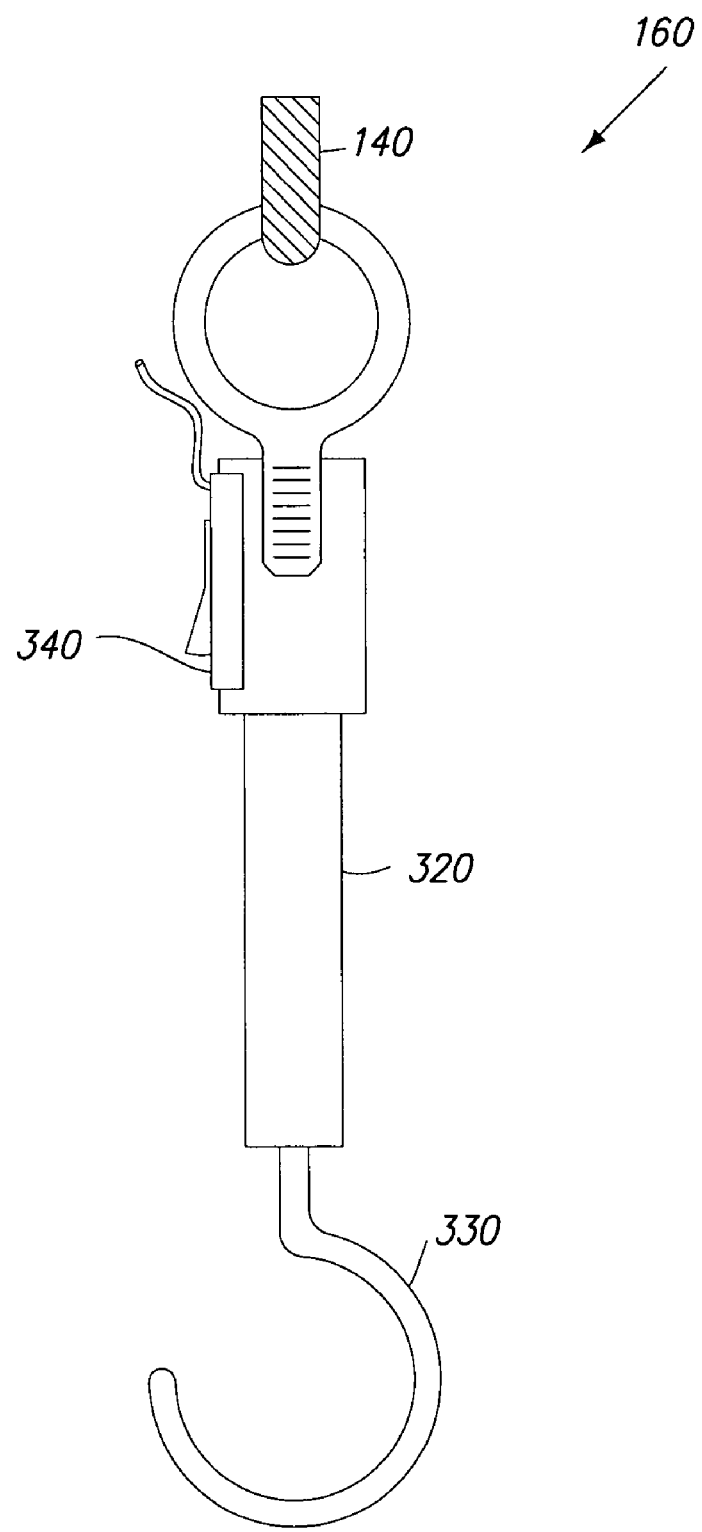
FIG. 13 is an orthographic drawing in accordance with an embodiment of the end-effector.

In accordance with another more detailed embodiment of the embodiment of FIG. 1, FIG. 13 is an orthographic drawing wherein end-effector 160 comprises an end-effector frame 320, a cargo interface 330, and an operator input sensor 340. End-effector frame 320 is mechanically coupled to line 140. Cargo interface 330 is mechanically coupled to end-effector frame 320 and, in operation, transmits the tensile force to object 110. Operator input sensor 340 is mechanically coupled to end-effector frame 320 and generates an operator input signal. In some embodiments, operator input sensor 340 is an electrical switch which generates an operator input signal. In some embodiments of the invention, as shown in FIG. 13, operator input sensor 340 is an electrical rocker switch.

Cargo interface 330 comprises any device or combination of devices capable of performing the indicated function. Examples of cargo interface 330 include, without limitation, hooks, suction cups, grippers, magnets, and combinations thereof.

Figure 16:
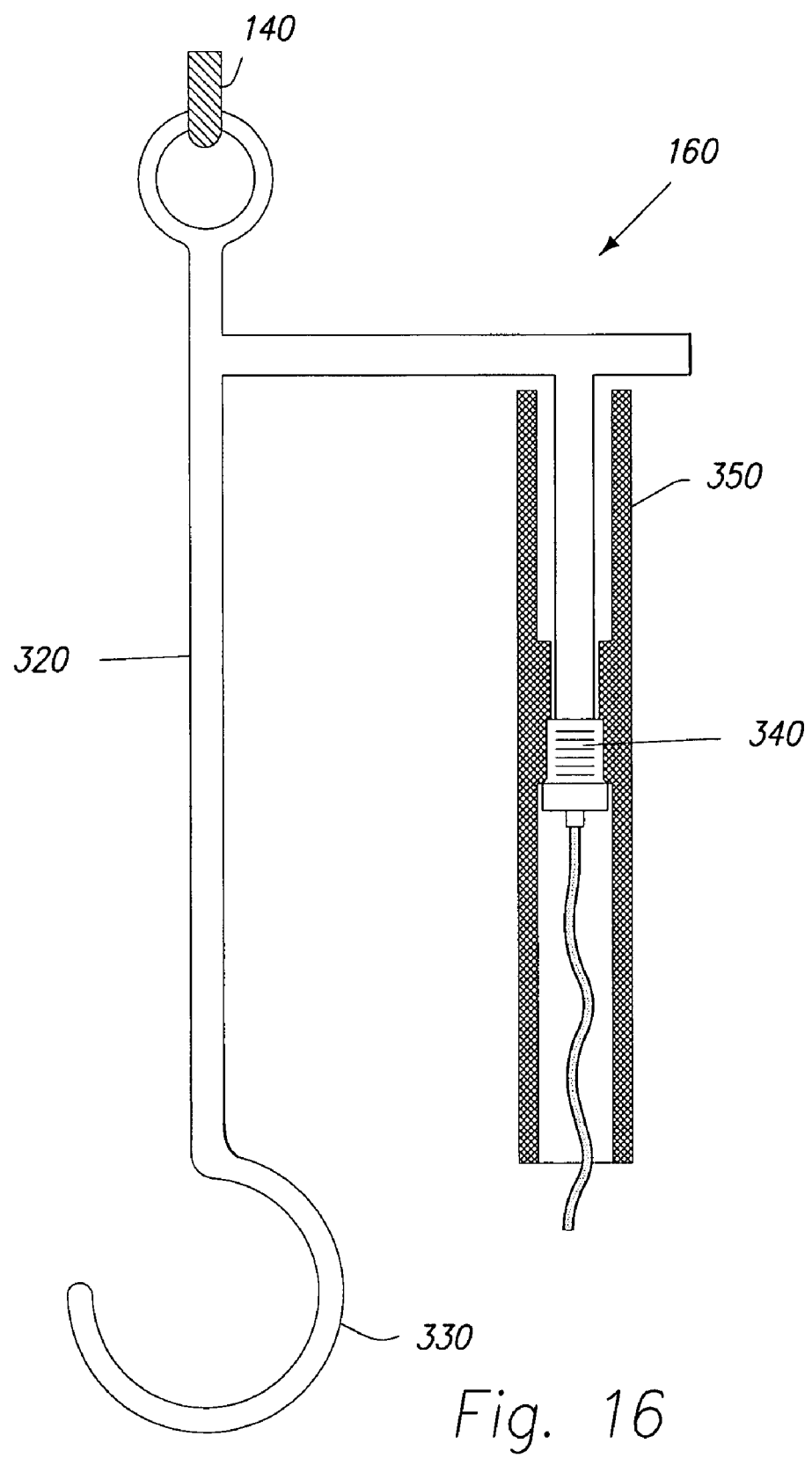
FIG. 16 is a orthographic drawing in accordance with an embodiment of the end-effector.

FIG. 16 shows an embodiment of the end-effector 160 where operator input sensor 340 is a force sensor. In this embodiments, operator input sensor 340 comprises any device or combination of devices capable of performing the indicated functions. Examples of operator input sensor 340 include, without limitation, piezoelectric force sensors, metallic strain gage force sensors, semiconductor strain gage force sensors, Wheatstone bridge-deposited strain gage force sensors, force sensing resistors, switches, displacement sensors, and combinations thereof.

Figure 17:
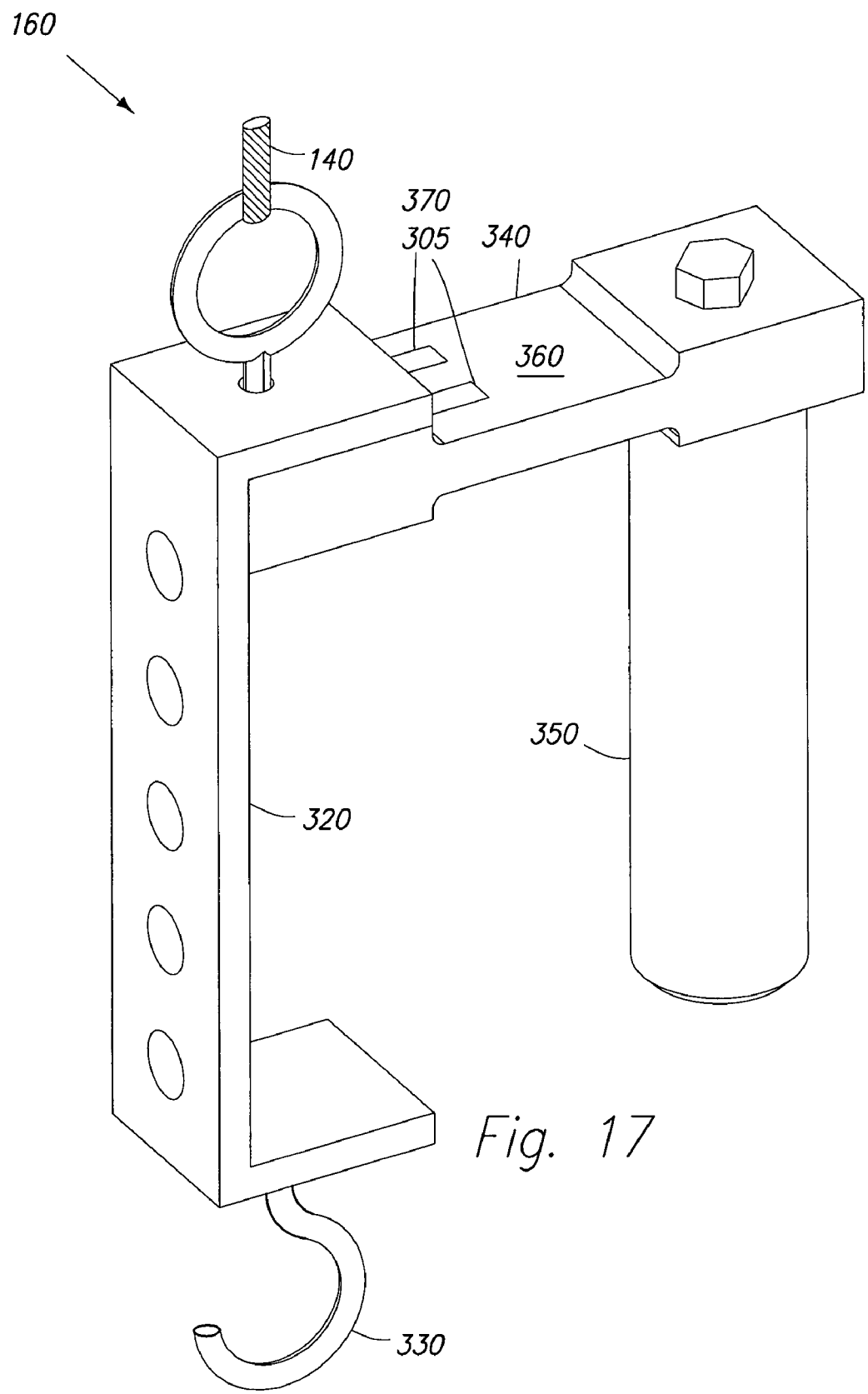
FIG. 17 is perspective drawing in accordance with an embodiment of the end-effector.

In accordance with another more detailed embodiment of the embodiment of FIG. 13, FIG. 17 is a perspective drawing wherein operator input sensor 340 comprises a compliant element 360, a handle 350 and a handle displacement sensor 370. Compliant element 360 is disposed between handle 350 and end-effector frame 320. In operation, handle displacement sensor 370 senses a deformation of compliant element 360 with the operator input signal being a function of the deformation. In some embodiments, handle displacement sensor 370 comprises two strain gages 305 attached to the top surface of compliant element 360 and two strain gages (not shown) attached to the bottom surface of compliant element 360. In this embodiment, operator input sensor 340 measures the operator force but it explicitly includes a displacement sensor.

Figure 18:
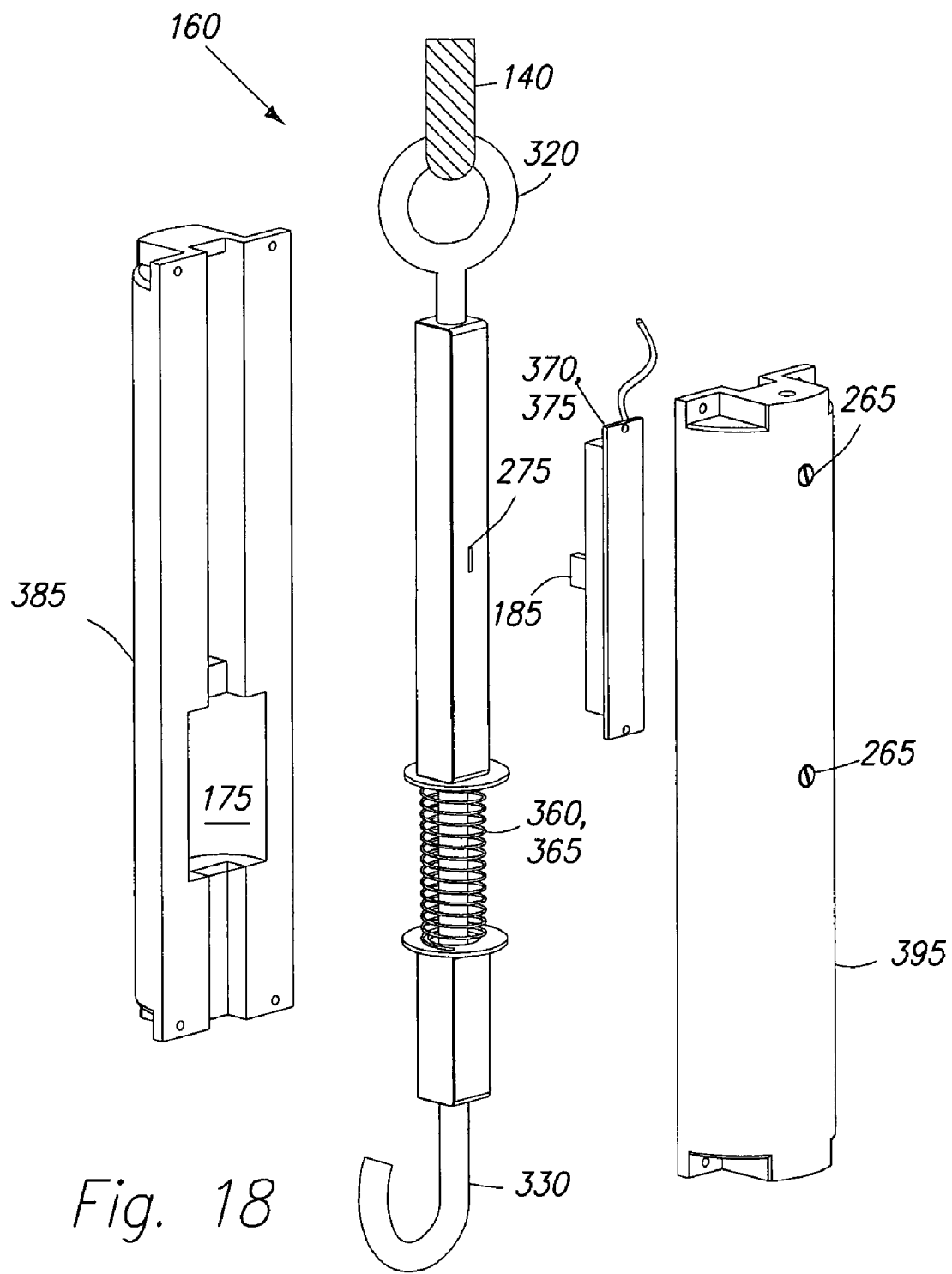
FIG. 18 is an exploded view of an embodiment of the end-effector.

In accordance with another more detailed embodiment of the embodiment of FIG. 17, FIG. 18 is an exploded perspective drawing wherein compliant element 360 comprises at least one compression spring 365. In some embodiments, handle 350 slides over end-effector frame 320 and comprises two handle halves 385 and 395 fastened together. Both handle halves 385 and 395 include cavities 175 to house compression spring 365.

In accordance with a more detailed embodiment of the invention, handle displacement sensor 370 comprises a linear potentiometer 375. Slider 185 of linear potentiometer 375 is coupled to end-effector frame 320 (e.g., by insertion in a hole 275), while linear potentiometer 375 is coupled to handle 350 (e.g. via fasteners 265). In operation, linear potentiometer 375 senses the deformation of compression spring 365 with the operator input signal being a function of the deformation. In some embodiments slider 185 is coupled to handle 350 while linear potentiometer 375 is coupled to end-effector frame 320.

Handle displacement sensor 370 comprises any device or combination of devices capable of performing the indicated functions. Examples of handle displacement sensor 370 include, without limitation, linear potentiometers, slide potentiometers, magnetic linear encoders, optical linear encoders, linear variable differential transformers, capacitive displacement sensors, eddy current proximity sensors, variable-inductance proximity sensors, rocker switches, slide switches, and combinations thereof.

Figure 19:
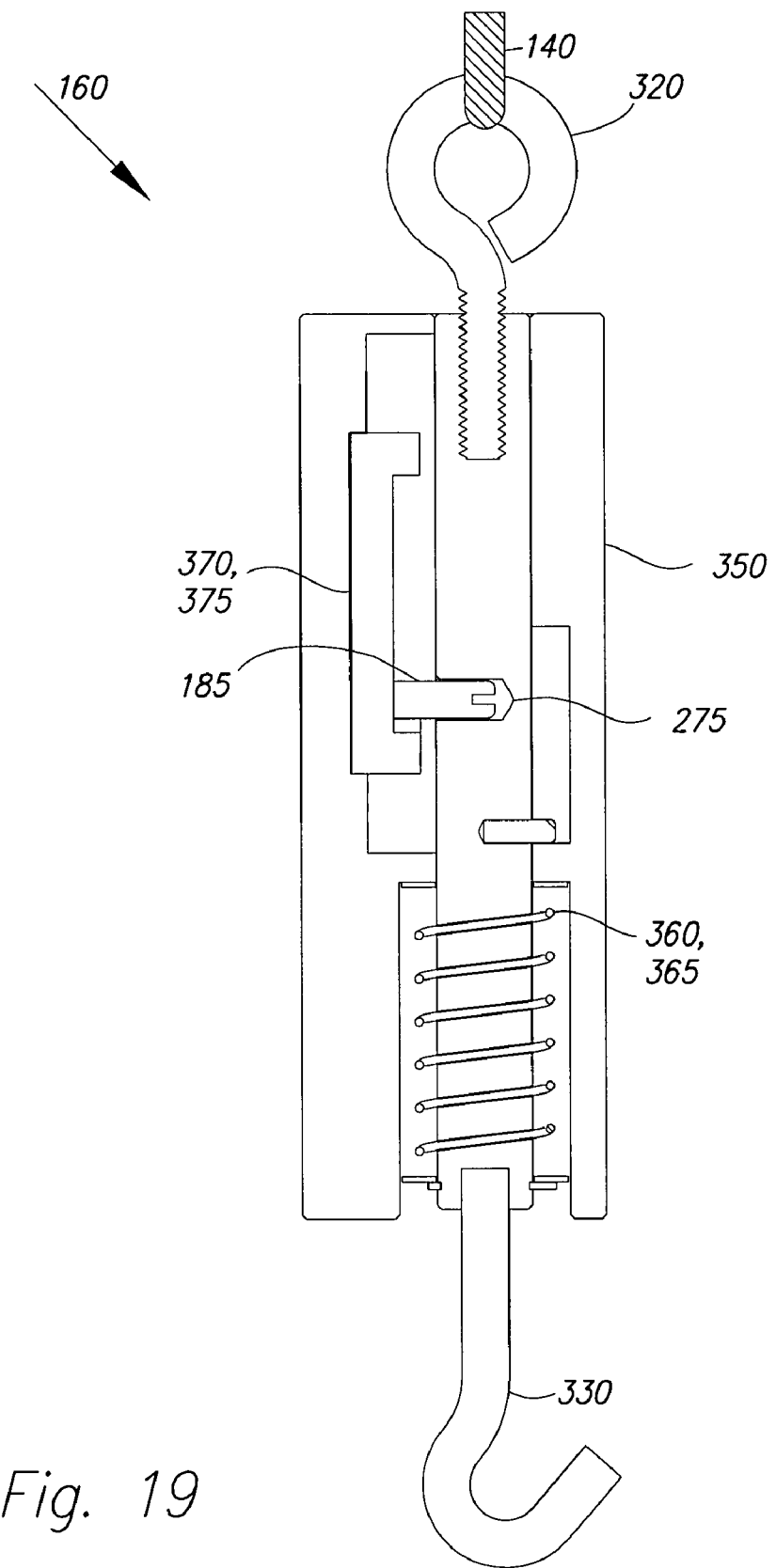
FIG. 19 is an orthographic drawing in accordance with an embodiment of the end-effector.

In accordance with another more detailed embodiment of the embodiment of FIG. 17, FIG. 19 is an orthographic drawing wherein compliant element 360 comprises one compression spring 365. Handle 350 slides over end-effector frame 320 and comprises two handle halves fastened together. This embodiment generates the operator input signal only when a downward force is exerted on handle 350. In accordance with a more detailed embodiment of the invention, handle displacement sensor 370 comprises a linear potentiometer 375.

Slider 185 of linear potentiometer 375 is coupled to end-effector frame 320 (e.g., by insertion in a hole 275), while linear potentiometer 375 is coupled to handle 350. In operation, linear potentiometer 375 senses the deformation of compression spring 365 with the operator input signal being a function of the deformation. In some embodiments slider 185 is coupled to handle 350 while linear potentiometer 375 is coupled to end-effector frame 320.

Figure 20:
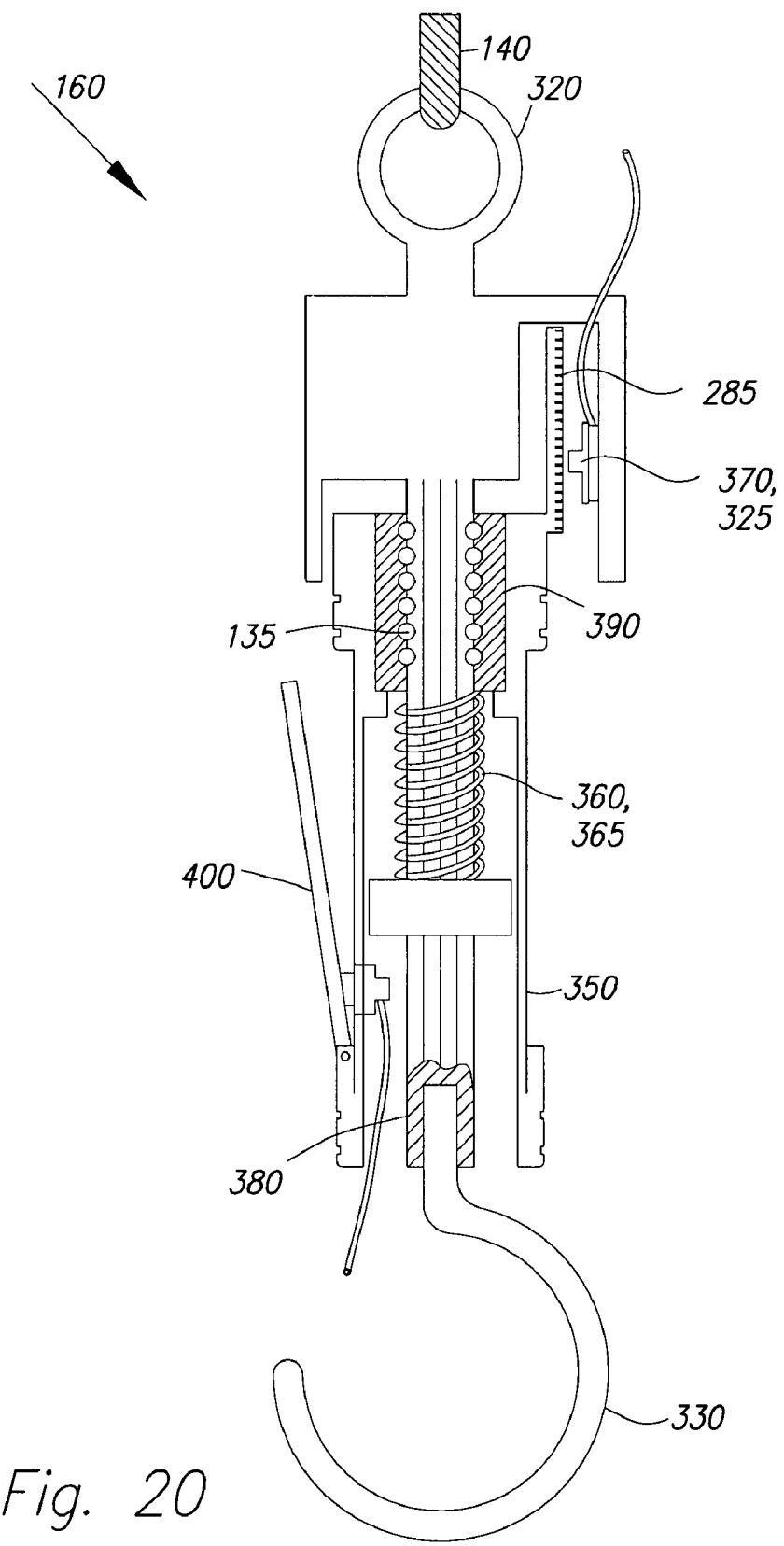
FIG. 20 is an orthographic drawing in accordance with an embodiment of the end-effector.

In accordance with another more detailed embodiment of the embodiment of FIG. 17, FIG. 20 is an orthographic drawing wherein end-effector frame 320 comprises a spline shaft 380, and handle 350 comprises a ball nut 390 coupling spline shaft 380. Balls 135 located in the grooves of spline shaft 380 facilitate linear motion of ball nut 390 and handle 350 along spline shaft 380. In accordance with another more detailed embodiment of the invention, handle displacement sensor 370 comprises an optical linear encoder 325 that generates pulses as it observes light or dark regions of reflective strip 285.

In accordance with another more detailed embodiment of FIG. 20, handle 350 further comprises a handle switch 400. In operation, handle switch 400 generates a handle switch signal indicating whether handle 350 is grasped or released. Controller 170 generates the actuator command from the handle switch signal and from the operator input signal. In some embodiments, controller 170 is adapted to hold actuator 150 stationary when handle switch 400 is not grasped by the operator.

Figures 21, 22, 23:
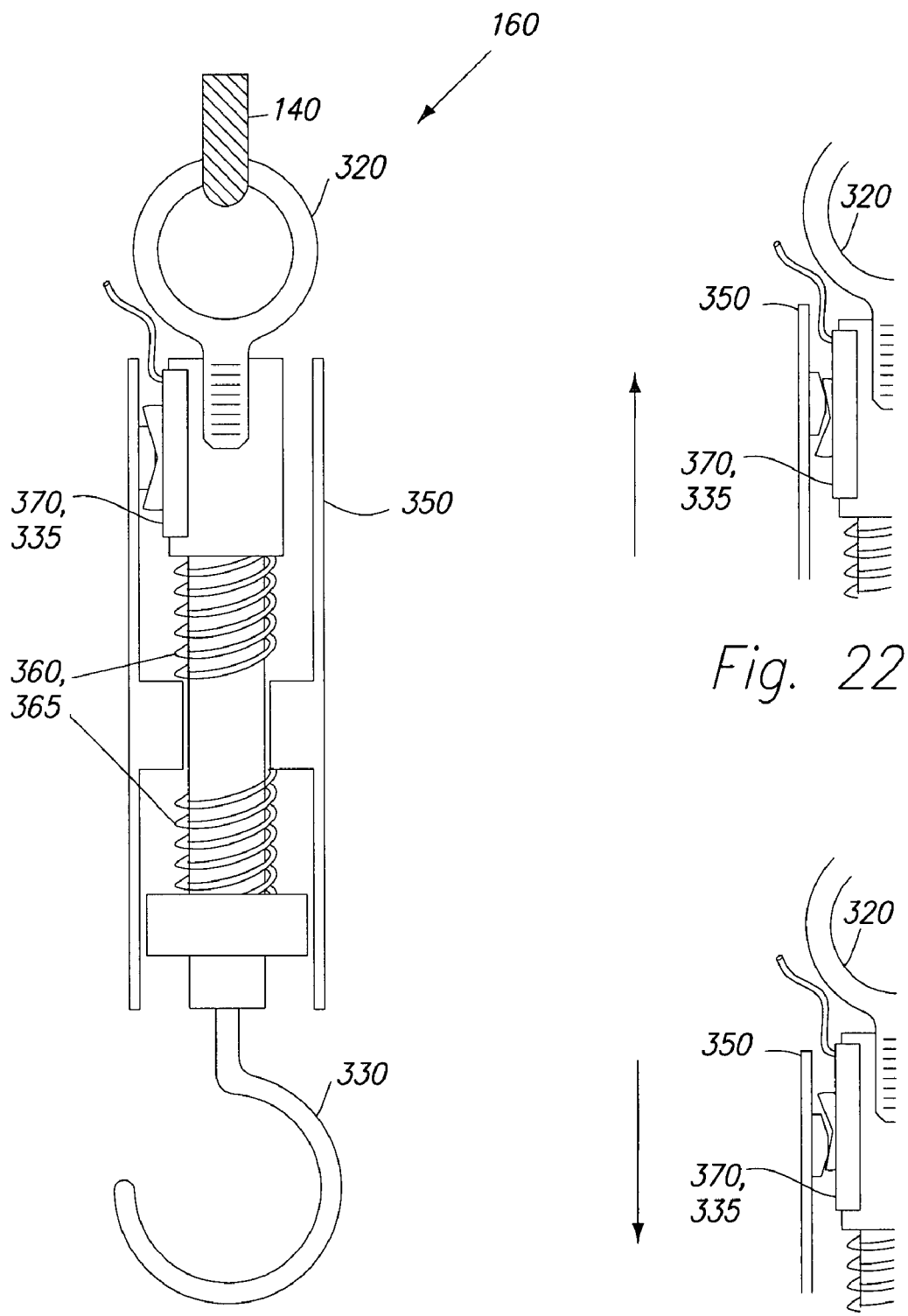
FIG. 21 is an orthographic drawing in accordance with an embodiment of the end-effector.
FIG. 22 is an orthographic drawing in accordance with a configuration of the embodiment of FIG. 21.
FIG. 23 is an orthographic drawing in accordance with another configuration of the embodiment of FIG. 21.

In accordance with another more detailed embodiment of the embodiment of FIG. 17, FIG. 21 is an orthographic drawing wherein compliant element 360 comprises two compression springs 365, and handle displacement sensor 370 comprises a rocker switch 335. This embodiment generates discrete values for the handle displacement and the operator can push upwardly and downwardly on handle 350. FIG. 21 shows end-effector 160 when handle 350 is in its neutral position. FIG. 22 shows end-effector 160 when handle 350 is pushed upwardly and rocker switch 335 is in the pressed position on its upper side. FIG. 23 shows end-effector 160 when handle 350 is pushed downwardly and rocker switch 335 is pressed on its lower side.

Figure 14:
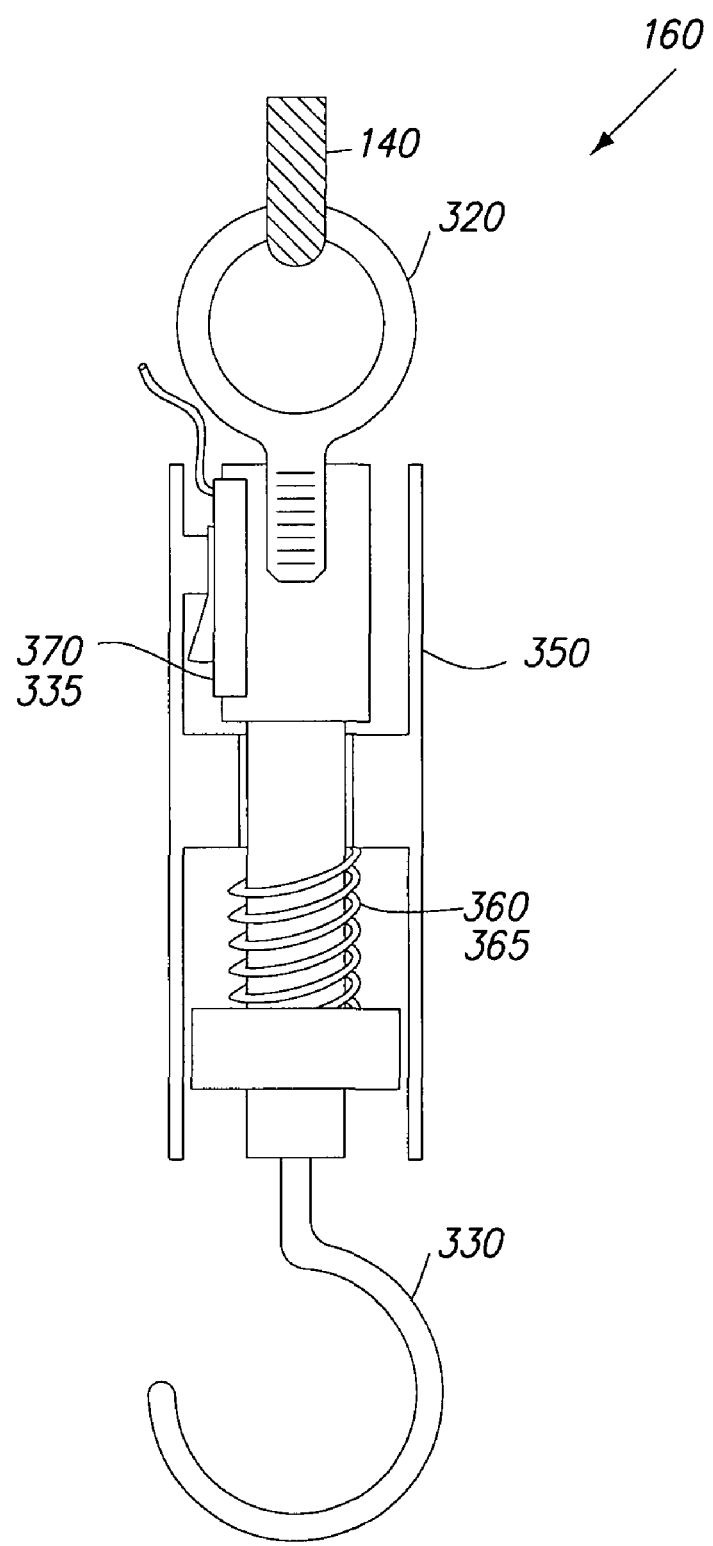
FIG. 14 is an orthographic drawing in accordance with an embodiment of the end-effector.
Figure 15:
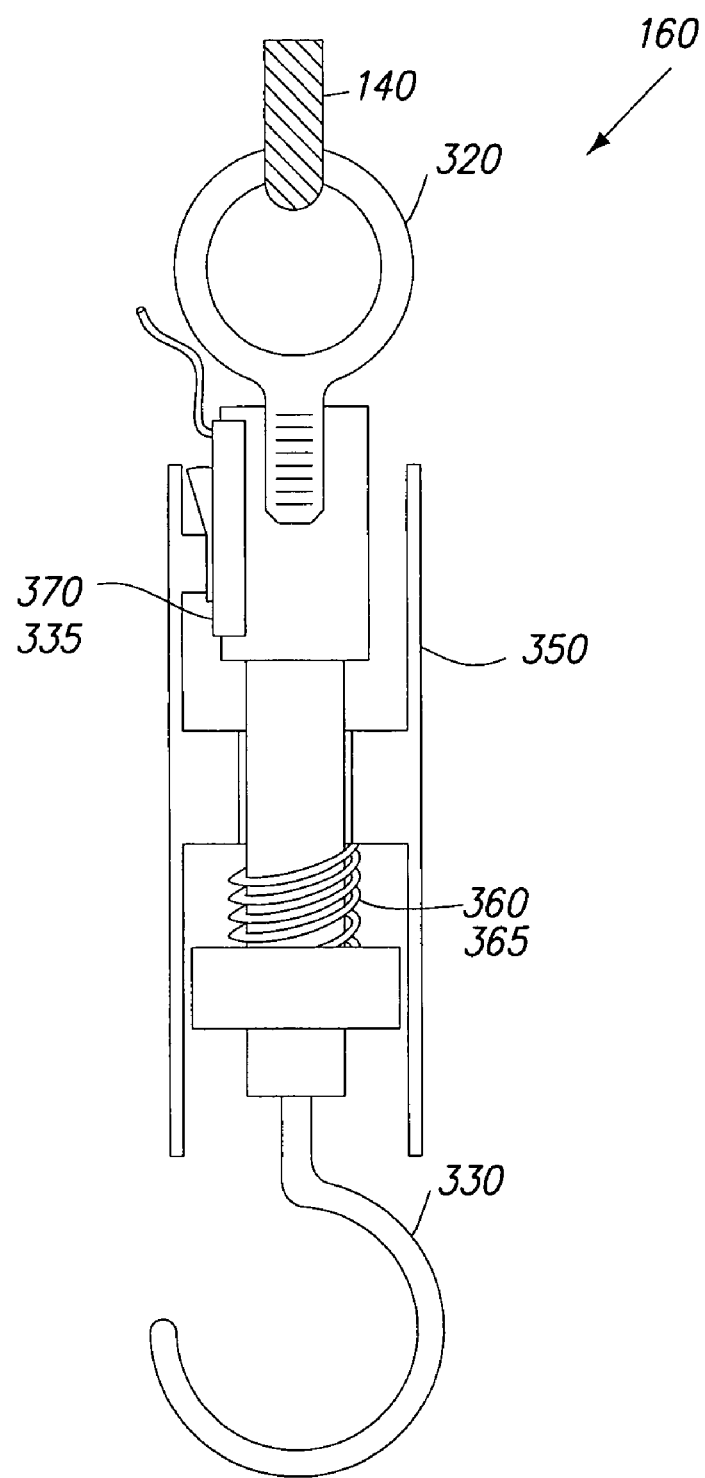
FIG. 15 is an orthographic drawing in accordance with a configuration of the end-effector.

In accordance with another more detailed embodiment of the embodiment of FIG. 17, FIG. 14 is an orthographic drawing wherein compliant element 360 comprises one compression spring 365, and handle displacement sensor 370 comprises a rocker switch 335. This embodiment generates two discrete values for the handle displacement and the operator can only push upwardly on handle 350. FIG. 14 shows end-effector 160 with handle 350 is moved upwardly depressing the upper side of rocker switch 335. When handle 350 is moved downwardly, the lower side of rocker switch 335 is depressed (FIG. 15).

In some embodiments, as shown in FIG. 14, a handle 350 is mechanically coupled to operator input sensor 340 and adapted to be grasped by the operator hand. FIG. 14 shows end-effector 160 with handle 350 is moved upwardly depressing the upper side of rocker switch 335. When handle 350 is moved downwardly, the lower side of rocker switch 335 is depressed (FIG. 15).

Figure 24:
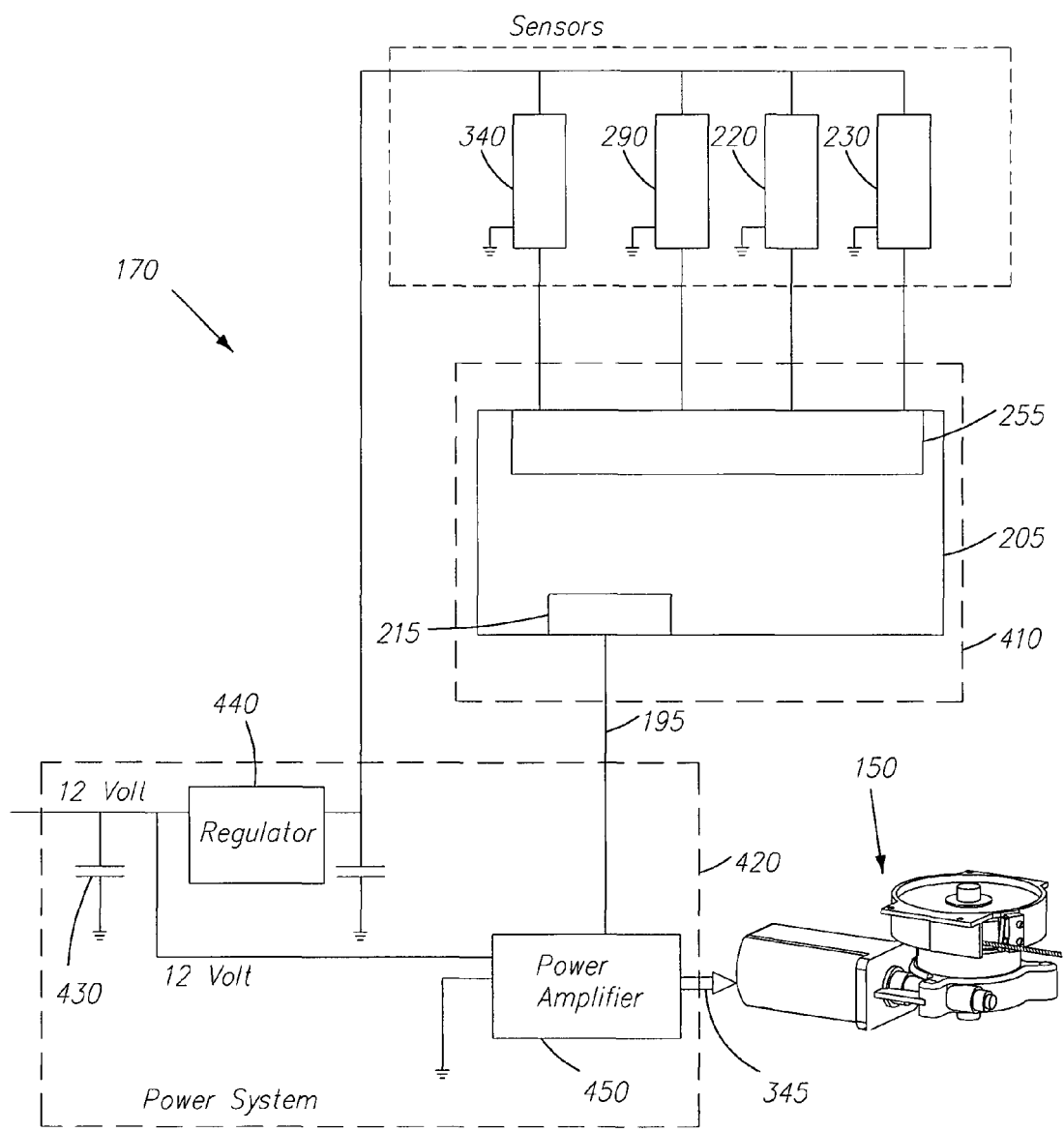
FIG. 24 is a schematic drawing in accordance with embodiment of the controller.

In accordance with another more detailed embodiment of the embodiment of FIG. 1, FIG. 24 is a schematic drawing wherein controller 170 comprises a signal processor 410 and a power system 420. In operation, signal processor 410 generates an amplifier command signal 195 from the operator input signal; power system 420 generates actuator command 345 from amplifier command signal 195.

Signal processor 410 comprises any device or combination of devices capable of performing the indicated functions. Examples of such devices include, without limitation: analog devices; analog computation modules; digital devices including, without limitation, small-, medium-, and large-scale integrated circuits, application specific integrated circuits (ASICs), programmable gate arrays (PGAs), and programmable logic arrays (PLAs); and digital computation modules including, without limitation, microcomputers, microprocessors, microcontrollers, and programmable logic controllers (PLCs).

In some embodiments, signal processor 410 comprises electromechanical relays or MOSFET switches.

In accordance with another detailed embodiment of the invention, signal processor 410 generates amplifier command signal 195 from any signal or combination of signals generated by upper limit sensor 290, lower limit sensor 230, slack sensor 220 and operator input sensor 340.

In accordance with another detailed embodiment of the invention, signal processor 410 comprises a micro processor 205, an output port 215 to generate amplifier command signal 195 and an input port 255 to read signals from upper limit sensor 290, lower limit sensor 230, slack sensor 220, operator input sensor 340, or any combination thereof. Input port 255 comprises any device or combination of devices capable of performing the indicated function including, without limitation, analog-to-digital converter ports, digital input ports, counter ports, and quadrature counter ports. Output port 215 comprises any device or combination of devices capable of performing the indicated function including, without limitation, digital-to-analog converter ports, Pulse Width Modulation (PWM) signal ports, and digital output ports.

In a more detailed embodiment of the invention, power system 420 comprises a power amplifier 450. In operation power amplifier 450 generates actuator command 345 from amplifier command signal 195. In another more detailed embodiment in accordance with the embodiment of FIG. 24, power amplifier 450 comprises a PWM type amplifier.

In some embodiments, power system 420 comprises an input filter 430 to filter a raw supply voltage to produce a filtered supply voltage. In some embodiments, raw supply voltage is provided from a vehicle battery. In some embodiments the raw supply voltage is about 12 volts. In some embodiments the raw supply voltage is greater than 12 volts. In some embodiments, power system 420 comprises a voltage regulator 440 to produce a regulated voltage suitable for powering various sensors.

In another more detailed embodiment in accordance with the embodiment of FIG. 24, input filter 430 comprises an input filter capacitor 460 having a capacitance of about 10 microfarads, and voltage regulator 440 comprises an output filter capacitor 460 having a capacitance of about 10 microfarads.

In another more detailed embodiment in accordance with the embodiment of FIG. 24, controller 170 comprises an internal current feedback controller for motor 190. In another more detailed embodiment in accordance with the embodiment of FIG. 24, controller 170 comprises an internal velocity feedback controller for motor 190.

Figure 25:
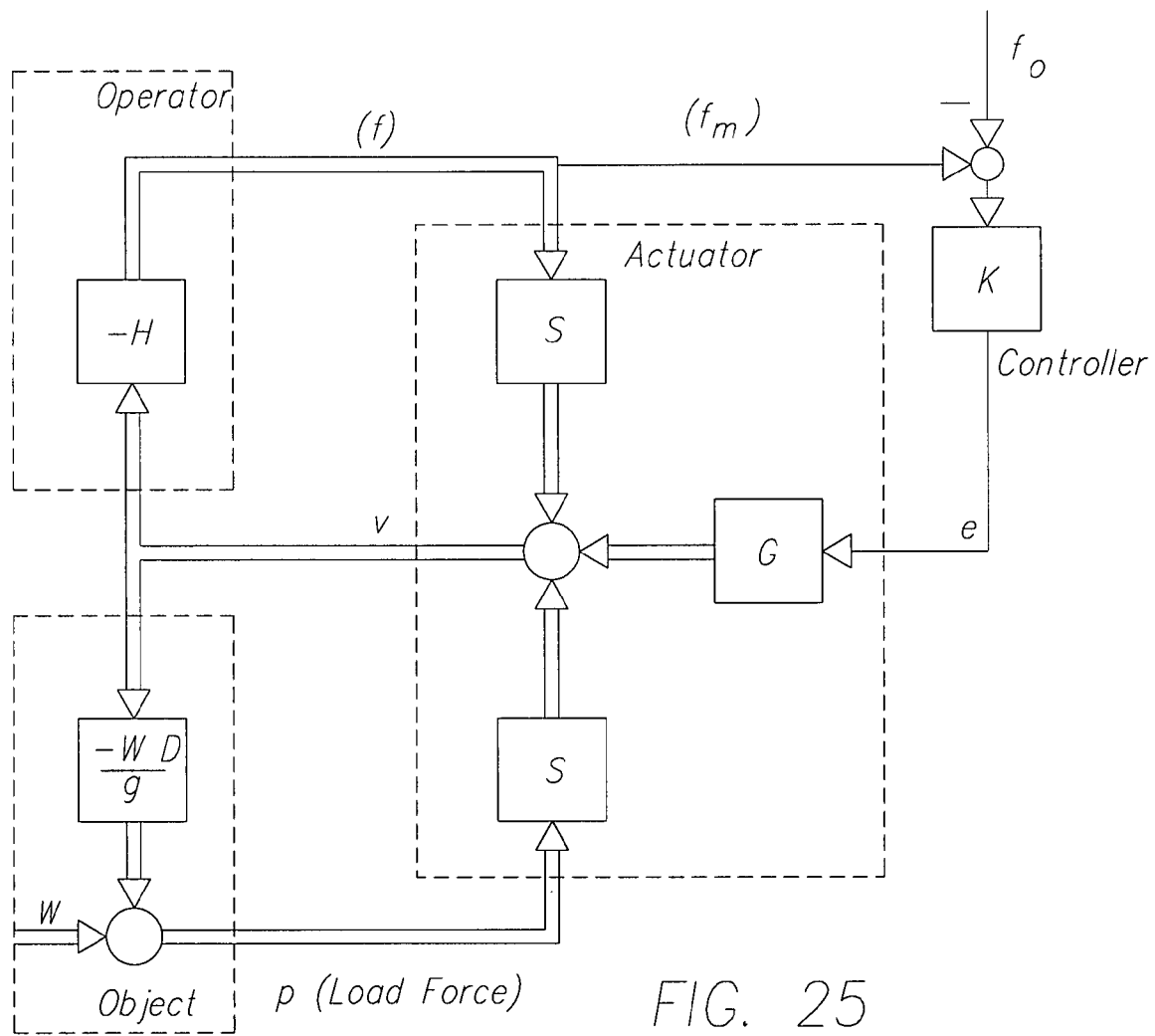
FIG. 25 is a schematic of an embodiment of the control block diagram of the invention.

FIG. 25 is an embodiment of the control block diagram of the invention. Amplifier command signal 195 is represented by (e) where positive values for (e) indicate lowering end-effector 160 and that negative values for (e) indicate lifting the end-effector 160. Also assume that a zero value for (e) indicates zero speed for end-effector 160. The linear velocity of end-effector 160 is represented by (v). If the line tensile force is denoted by ($f_R$), then equation (1) represents the speed of end-effector 160 as a function of (e) and the line tensile force, ($f_R$).

$$V = G \times e + S \times f_R \quad (1)$$

where (G) is the actuator transfer function that relates the amplifier command signal, (e), to the end-effector speed, (v). A positive value for (v) means a downward speed of end-effector 160. (S) is the actuator sensitivity transfer function which relates the line tensile force ($f_R$) to the end-effector velocity (v). If a closed loop velocity controller is designed for the actuator such that (S) is small, the actuator has only a small response to the line tensile force. The line tensile force, ($f_R$), can be represented by equation (2):

$$f_R = f + p \quad (2)$$

where (f) is the operator-applied force on end-effector 160 and force (p) is imposed by object 110 and end-effector 160, referred to herein as the "load force" on line 140. Positive values for (f) and (p) represent downward forces. Note that (p) is force imposed on line 140 and is equal to the weight and inertia force of object 110 and end-effector 160 taken together as expressed by equation (3).

$$p = W - \frac{W}{g} \frac{d}{dt} v$$

where W is the weight of the end-effector and the object taken together as a whole and $$\left( \frac{d}{dt} v \right)$$

is the end-effector acceleration. (f) is a function of the operator dynamics represented by H in FIG. 25. The human dynamics, (H), varies from person to person and it also within a person as a function of time and posture. Variable D, in FIG. 25, is the Laplace operator.

The operator input signal from operator input sensor 340 is denoted as ($f_m$). If slack sensor 220 is not indicating any slack in line 140, and lower limit sensor 230 and upper limit sensor 290 are indicating that end-effector is not at its prescribed lower limit and upper limit positions, then it is reasonable to assign amplifier command signal 195 to be:

$$e = K \times (f_m - f_o) \quad (4)$$

where (K) is a controller transfer function and ($f_o$) is a biased variable to calibrate the measurement of operator input sensor 340. In general, the magnitude and sign of ($f_m$) depend on many factors including the sensor and the data acquisition gains; ($f_O$) is used in equation (3) to deal with these factors. Substituting for ($f_R$) and (e) from equations (2) and (4) into equation (1) results in the following equation for the end-effector velocity (v):

$$v = K \times (f_m - f_o) + S \times (f + p) \quad (5)$$

Equation 5 demonstrates that the operator force, (f), and the operator input signal, ($f_m$), contribute to the velocity of end-effector 160. In this way, end-effector 160 follows human arm motions. One can arrive at appropriate values for ($f_o$) and (K) so stable and safe desired maximum upward and downward speeds for the end-effector are achieved.

Assume a situation where end-effector of embodiment of FIG. 19 or FIG. 20 is used where only operator downward movements can be measured. In this case ($f_o$) may be set to a value such that when the operator leaves the handle (i.e. $f_m = 0$), the end-effector automatically moves upwardly with the desired maximum speed of $v_{up}$.

$$v_{up} = K \times (-f_o) + S \times p \quad (6)$$

When the operator pushes downwardly, the desired maximum end-effector speed will be $$v_{down} = K \times (f_m - f_o) + S \times (f + p) \quad (7)$$

Using equations (6) and (7) and choosing comfortable and safe desired maximum upward and downward speeds for the end-effector, one can arrive at appropriate values for ($f_o$) and (K).

The choice of controller (K), must not only yield the desired performance, but also stabilize the closed loop system of FIG. 25. Linear system theory is employed here to disclose the system properties; however, one can also use nonlinear models and follow the mathematical procedure described above to describe the system dynamic behavior and design controllers.

Depending on the state of lower limit sensor 230, upper limit sensor 290 and slack sensor 220, the amplifier command signal, (e), may take on values different from what equation (4) prescribes. In accordance with a more detailed embodiment of the invention, FIG. 26 shows an embodiment of the control logic if end-effector of embodiment of FIG. 19 (measuring downward movements only) is employed. With proper choice of ($f_o$) and (K) in equation (3), (e) can be produced such that when the operator has left the handle, end-effector 160 automatically moves upwardly at an appropriate speed. In this embodiment, as the operator pushes downwardly on handle, the upward end-effector speed becomes smaller. As the operator continues to further push downwardly, at some position of the handle, the pulley and consequently, the end-effector, come to zero speed. When the operator continues to push further on the handle, the end-effector will change its direction of motion and will start to move downwardly. When the operator leaves the handle, the handle moves quickly upwardly by the force of compression spring 365, with end-effector 160 automatically moving upwardly until the upper limit sensor is pressed.

In accordance with a more detailed embodiment of the embodiment of FIG. 26, controller 170 implements a method wherein end-effector 160 is stopped when upper limit sensor 290 is activated and the operator input signal generated by operator input sensor 340 does not indicate an operator intention for lowering end-effector 160.

In accordance with a more detailed embodiment of the embodiment of FIG. 26, controller 170 implements a method wherein end-effector 160 is stopped when lower limit sensor 230 is activated and the operator input signal generated by operator input sensor 340 does not indicate an operator intention for raising end-effector 160.

In accordance with a more detailed embodiment of the embodiment of FIG. 26, controller 170 implements a method wherein end-effector 160 is stopped when slack sensor 220 is activated and the operator input signal generated by operator input sensor 340 does not indicate an operator intention for raising end-effector 160.

The embodiment of FIG. 26 teaches the practitioners an embodiment in creating intelligent and safe behavior for the system using signals described here. One can arrive at a variety of behaviors for the system as a function of various signals. Additionally one can also use other switches and sensors to create a more complex logic behavior for the system. Furthermore, lower limit sensor 230, upper limit sensor 290 and slack sensor 220 can be used with all types of lift devices including the embodiments where operator input sensor 340 is not coupled to end-effector 160.

In some embodiments, where load bearing member 130 is the vehicle rear door, vehicle 120 further comprises a holding system. In operation, the holding system, when vehicle rear door 130 moves to its open position, securely holds vehicle rear door 130 in an open position against at least a portion of the tensile force in line 140.

Figure 27:
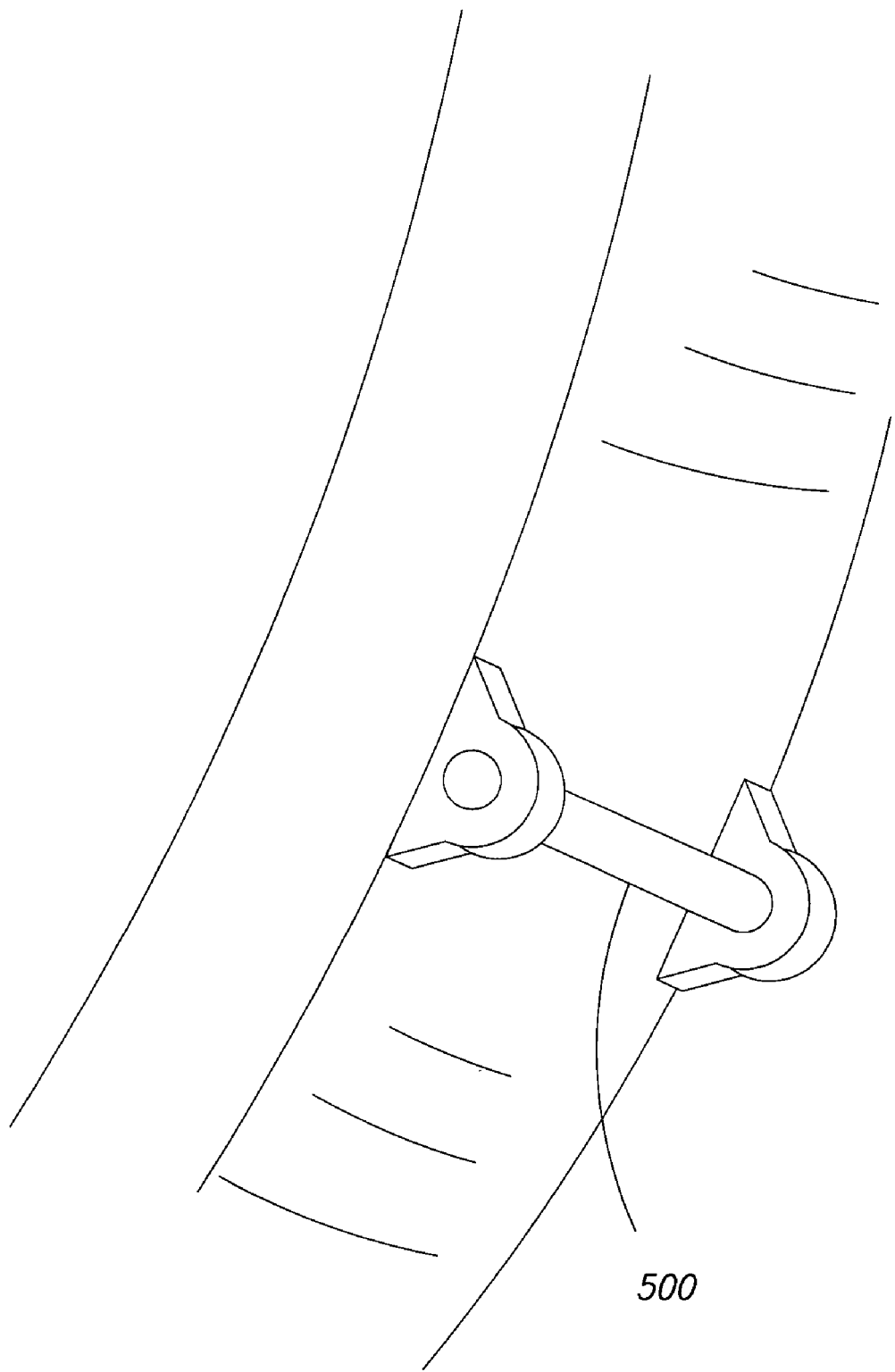
FIG. 27 is an orthographic drawing in accordance with an embodiment of the locking bracket.
Figure 28:
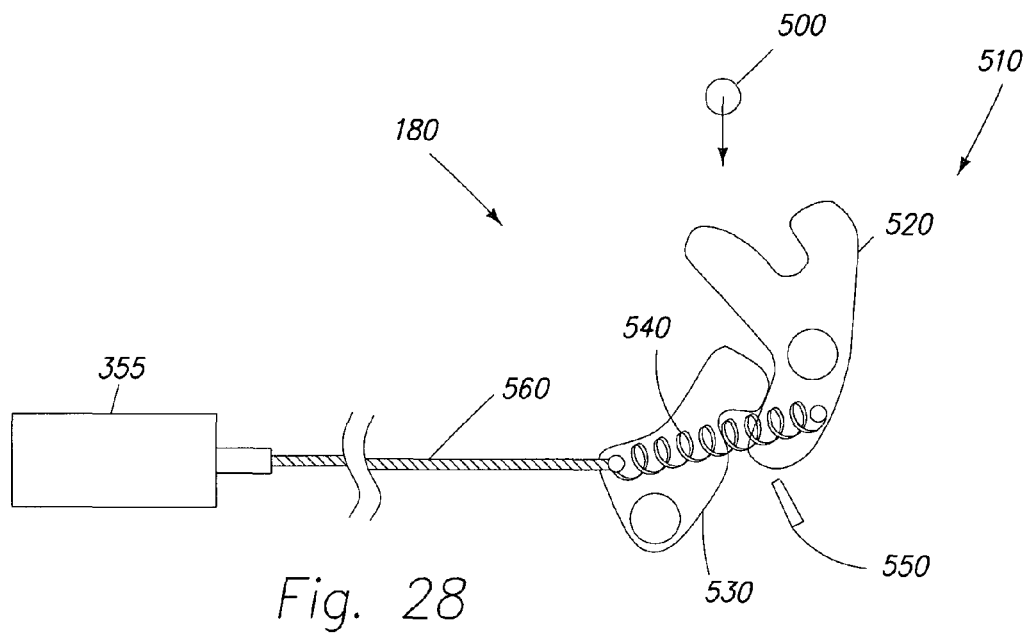
FIG. 28 is an orthographic drawing in accordance with an embodiment of the holding system.
Figure 29:
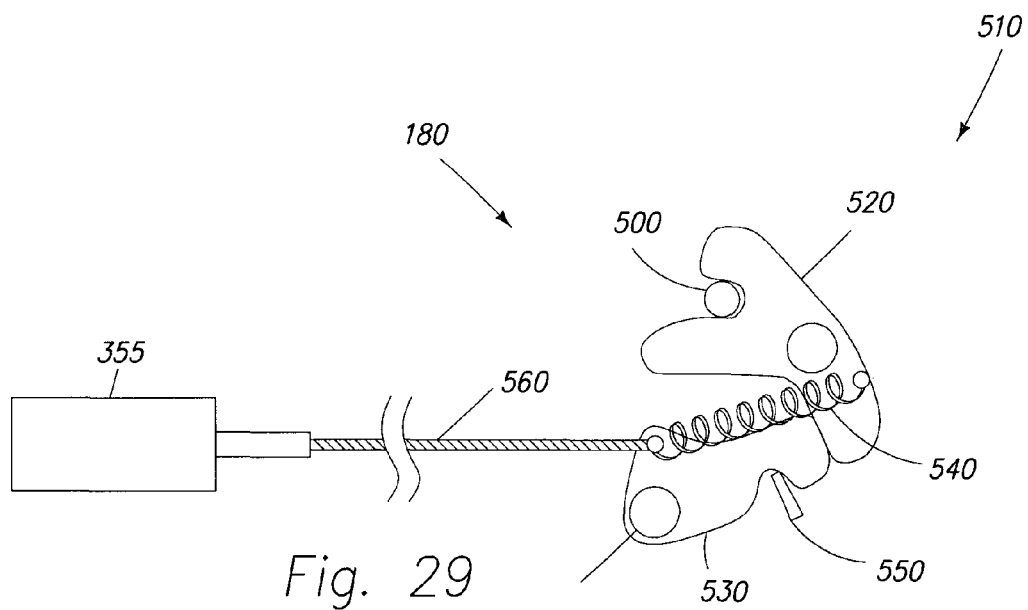
FIG. 29 is an orthographic drawing in accordance with a configuration of the embodiment of FIG. 28.

In accordance with another more detailed embodiment of the present invention, FIG. 28 is an orthographic drawing wherein holding system 180 comprises a locking bracket 500 and a locking mechanism 510. Locking bracket 500 is mechanically coupled to vehicle rear door 130 (see FIG. 27 for an example for placement of locking bracket 500 on a support portion of vehicle rear door 130). Locking mechanism 510 is mechanically coupled to the vehicle body and, in operation, receives and locks locking bracket 500 automatically when vehicle rear door 130 reaches an open position as shown in FIG. 29.

In accordance with another embodiment of the invention, locking bracket 500 is mechanically coupled to the vehicle body and locking mechanism 510 is mechanically coupled to vehicle rear door 130.

Locking bracket 500 comprises any device or combination of devices capable of performing the indicated functions. Examples of locking bracket 500 include, without limitation, pins, dowel pins, cylindrical rods, metallic brackets, and combinations thereof.

In a more detailed embodiment in accordance with the embodiment of FIG. 28, locking mechanism 510 comprises a first link 520, a second link 530, a linkage spring 540, a linkage stop 550, and a release member 560. First link 520 is rotatably coupled to vehicle 120 and, in operation, holds and releases locking bracket 500. Second link 530 is rotatably coupled to vehicle 120 and slides against first link 520 while linkage spring 540 develops a bias force between first link 520 and second link 530. Linkage stop 550 is mechanically coupled to vehicle 120 and prevents rotation of second link 530 when second link 530 is in a locked position. To release locking bracket 500, release member 560 applies a release torque to second link 530. FIG. 28 shows locking mechanism 510 in an unlocked position; FIG. 29 shows locking mechanism 510 in the locked position. When vehicle rear door 130 is moved to an open position, locking mechanism 510 receives and automatically locks locking bracket 500 preventing vehicle rear door 130 from moving out of the open position.

In accordance with another embodiment of the present invention, holding system 180 further comprises a release actuator 355. In operation release actuator, when activated, enables holding system 180 to let vehicle rear door 130 move out of its open position. In the embodiments of FIGS. 28 and 29, release actuator 355 releases locking bracket 500 when activated, enabling holding system 180 to let vehicle rear door 130 move out of the open position. Release actuator 355 comprises any device or combination of devices capable of performing the indicated functions. Examples of release actuator 355 include, without limitation, solenoids, linear motors, rotary motors, and combinations thereof.

Figure 30:
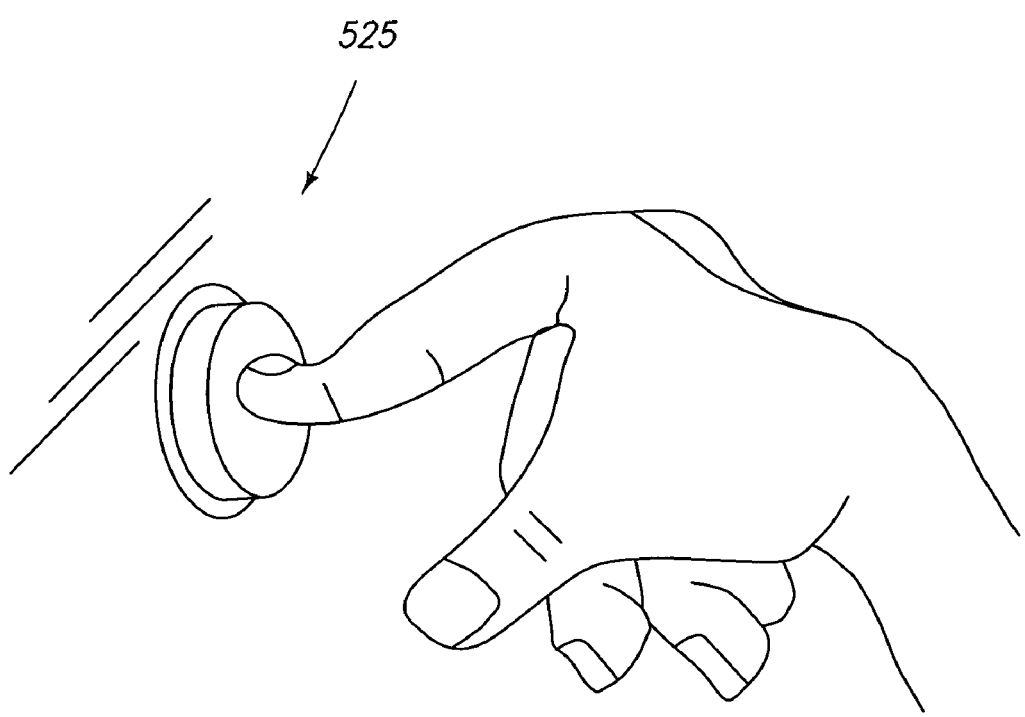
FIG. 30 is a perspective drawing in accordance with an embodiment of the operator release device.

In accordance with another embodiment of the present invention, holding system 180 further comprises an operator release device 525 (FIG. 30). In operation, operator release device 525 issues an operator release signal when activated by an operator. Operator release device 525 is disposed at any point on vehicle rear door 130 or the vehicle body and comprises any device or combination of devices capable of performing the indicated functions. Examples of operator release device include, without limitation, push buttons, pull buttons, pull handles, levers, buttons, keys, switches and knobs.

In accordance with another embodiment of the present invention, release actuator 355 is activated and enables holding system 180 to let vehicle rear door 130 move out of its open position when an operator activates operator release device 525. In accordance with an embodiment of FIGS. 28 and 29, release actuator 355 releases locking bracket 500 enabling vehicle rear door 130 to move out of the open position when the operator activates operator release device 525.

In accordance with another embodiment of the present invention, slack signal from slack sensor 220 is also used to control release actuator 355. In some embodiments, release actuator 355 is activated and enables holding system 180 to let vehicle rear door 130 move out of its open position when operator release device 525 is activated and no object is coupled line 140. In an embodiment of FIGS. 28 and 29, release actuator 355 releases locking bracket 500 and therefore vehicle rear door 130 will be released to move out of the open position when operator release device 525 is activated and slack sensor 220 indicates no object is coupled to line 140.

In accordance with another embodiment of the present invention, the upper limit signal from upper limit sensor 290 is also used to control release actuator 355. In some embodiments, release actuator 355 is activated and enables holding system 180 to let vehicle rear door 130 move out of its open position when operator release device 525 is activated, no object is coupled to line 140, and line 140 has reached an upper limit position. In an embodiment of FIGS. 28 and 29, release actuator 355 releases locking bracket 500 enabling vehicle rear door 130 to move out of the open position when operator release device 525 is activated, slack sensor 220 indicates that no object is coupled to line 140, and upper limit sensor 290 indicates end-effector 160 has reached the prescribed upper limit position.

Practitioners are encouraged to ensure various safety systems are in place. In general there are a great variety of interlock systems to create safe behavior. In accordance with another embodiment of the holding system, holding system 180 comprises a vehicle rear door position sensor to sense the status of vehicle rear door 130. The lifting process should be inhibited (i.e., the end-effector is prevented from moving) if the vehicle rear door position sensor detects that vehicle rear door 130 is not in its open position.

Figure 31:
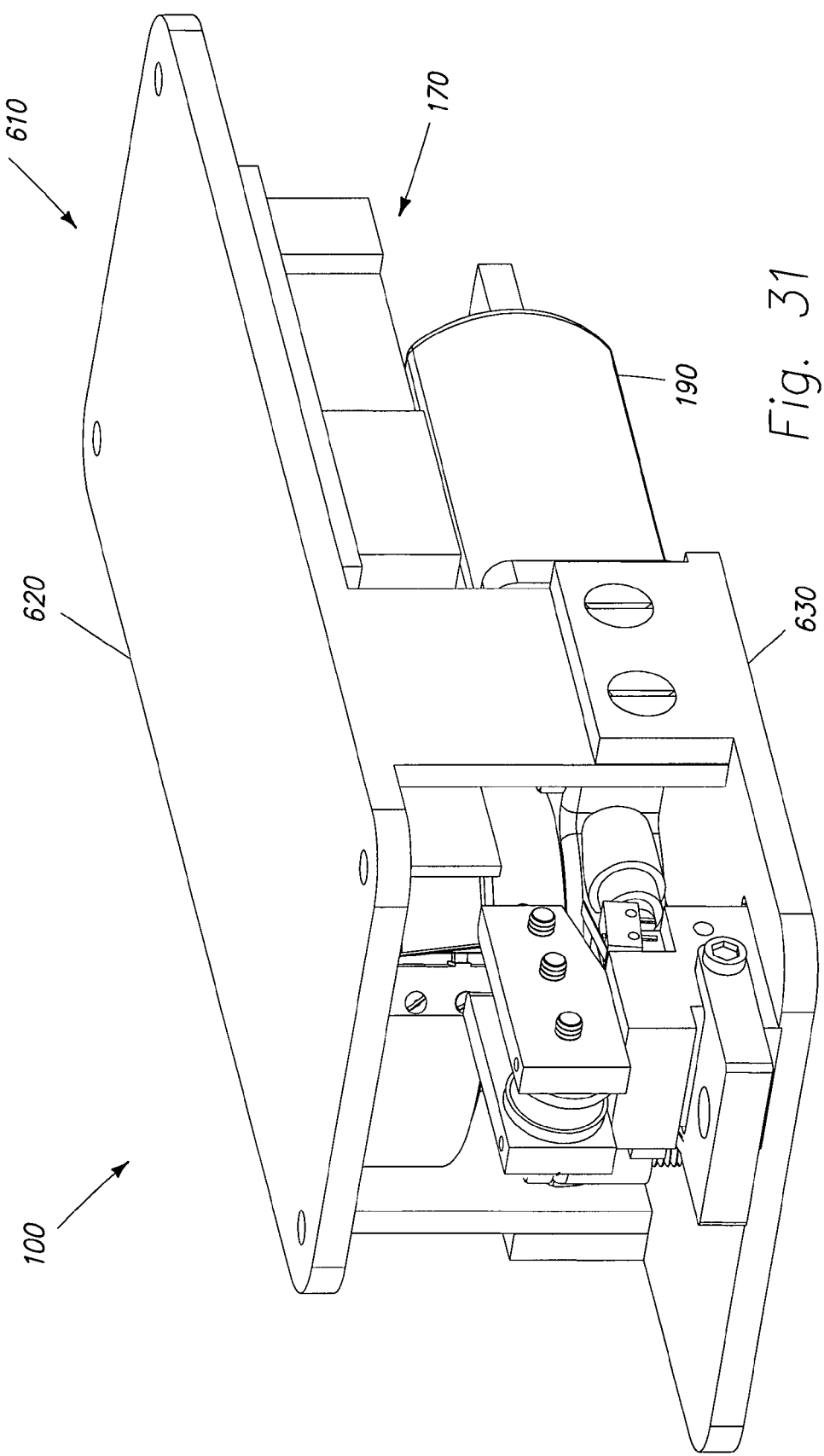
FIG. 31 is a perspective drawing of an embodiment of the actuator.
Figure 32:
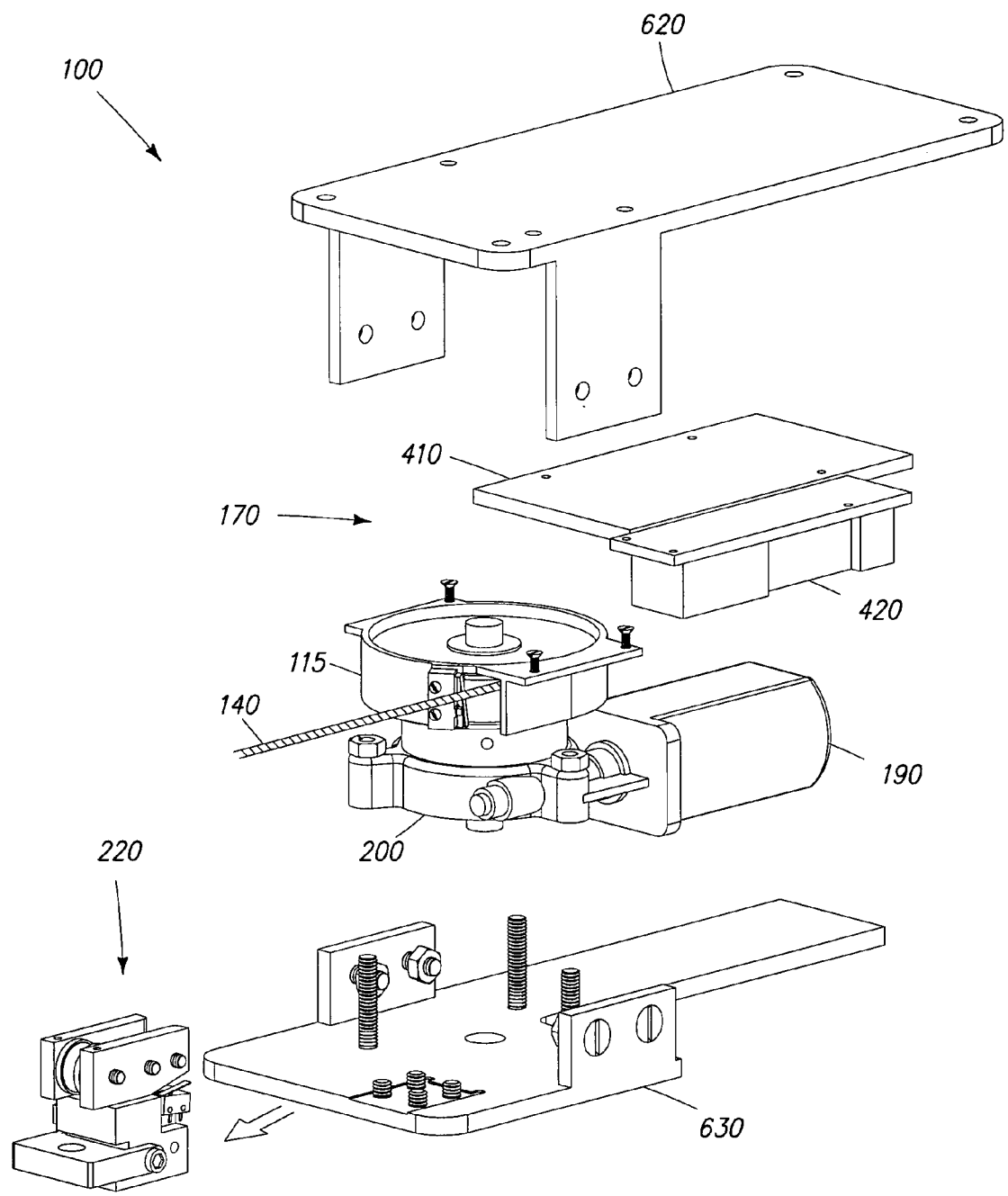
FIG. 32 is an exploded perspective drawing in accordance with a more detailed embodiment of the embodiment of FIG. 31.

In accordance with another embodiment of the present invention, FIG. 31 is a perspective drawing wherein actuator 150 and controller 170 are mechanically coupled to mounting frame 610. FIG. 32 is an exploded perspective drawing of embodiment of FIG. 31. In some embodiments, actuator 150 and controller 170 are located in two different places on the vehicle.

Figure 33:
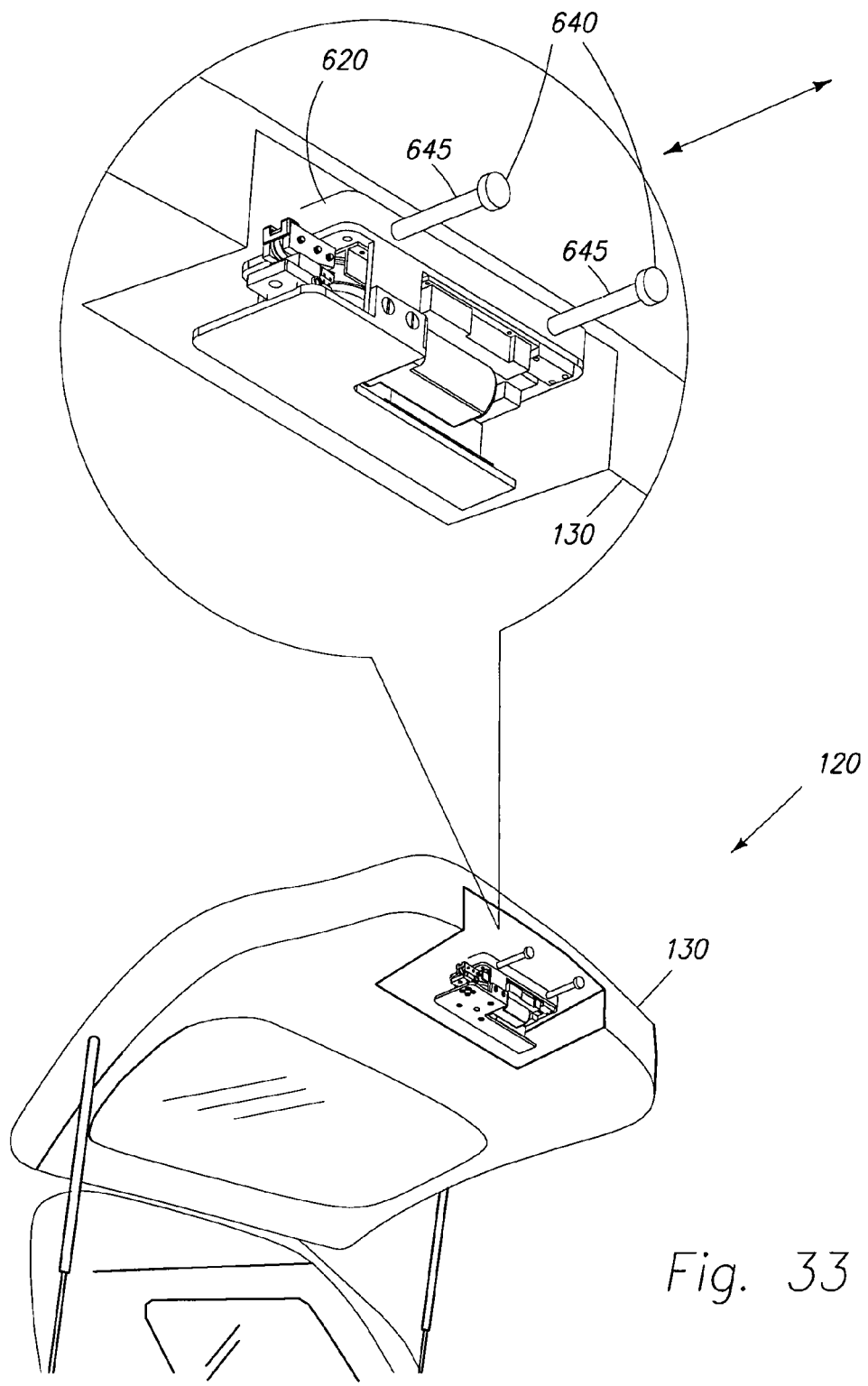
FIG. 33 is a perspective drawing in accordance with an embodiment of the invention.

In accordance with another more detailed embodiment of the invention, FIG. 33 is a perspective drawing wherein load bearing member 130 is the vehicle rear door and comprises at least one motion guide 640. In operation, motion guide 640 guides the position of line 140 with respect to vehicle rear door 130. In some applications, manipulation of object 110 is facilitated by being able to move the position of line 140 to alternative locations (e.g., farther from the vehicle to prevent rubbing object 110 against the vehicle bumper). In some embodiments, additional motion guides 640 guide motion of actuator 150 in a variety of straight and curvy paths. In a more detailed embodiment in accordance with the embodiment of FIG. 33, motion guide 640 comprises rod bearings 645.

In some embodiments of the invention, where load bearing member 130 is either the vehicle roof or the vehicle ceiling, the vehicle roof or the vehicle ceiling comprises motion guide 640 (similar to embodiment of FIG. 33). In operation, motion guide 640 guides the position of line 140 with respect to the vehicle ceiling or the vehicle roof. In some embodiments, motion guide 640 moves the position of line 140 farther from the vehicle to prevent rubbing object 110 against the vehicle bumper.

Figure 34:
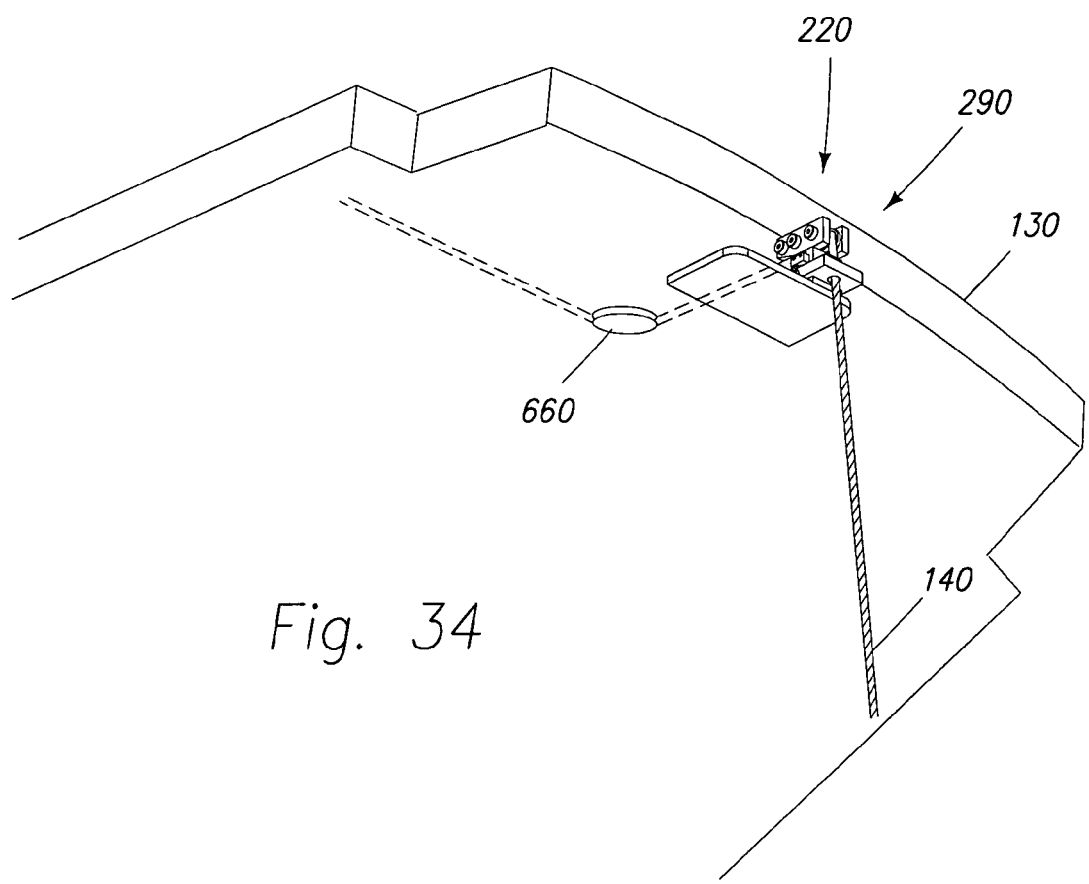
FIG. 34 is a perspective drawing in accordance with an embodiment of the invention.
Figure 35:
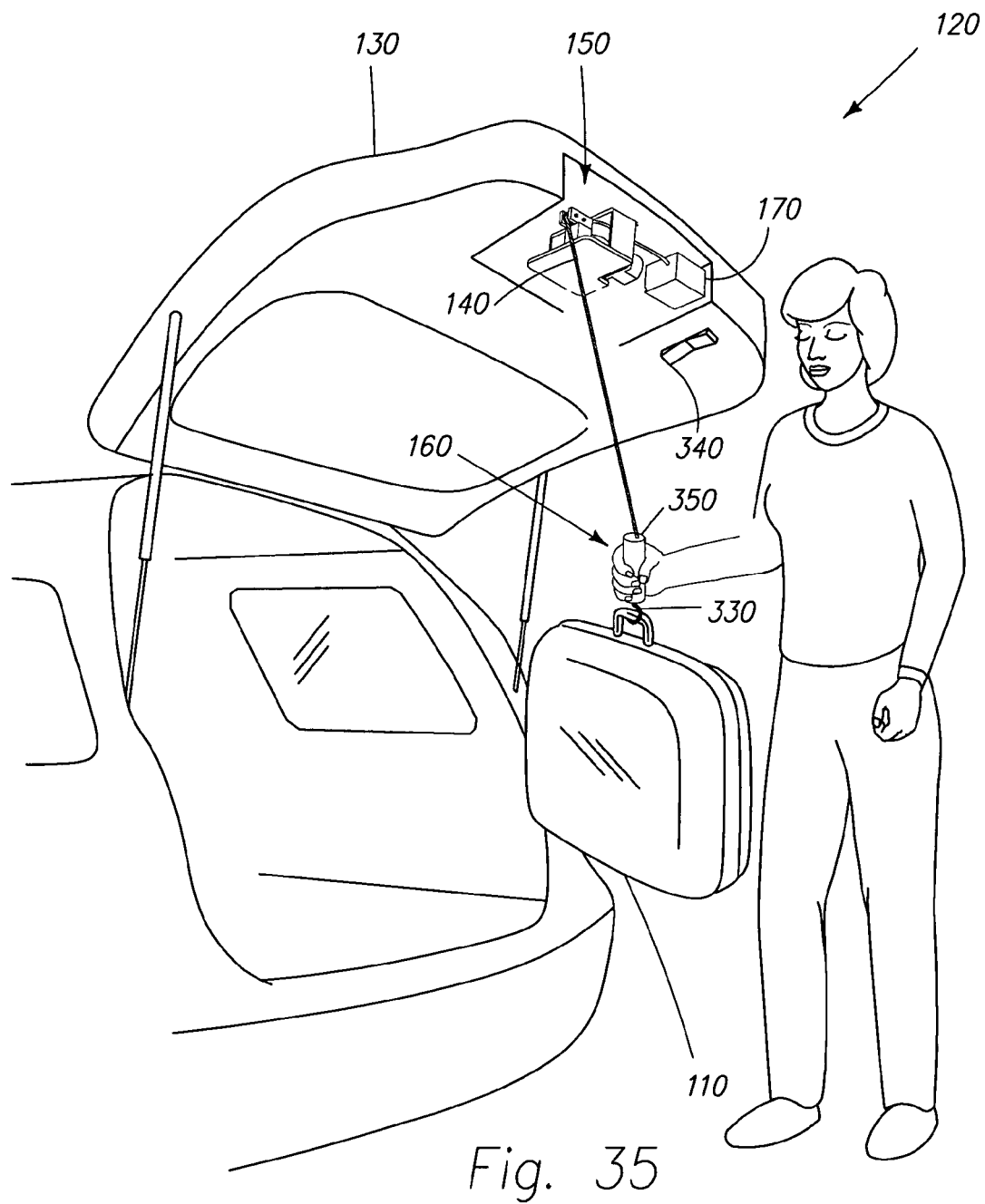
FIG. 35 is a perspective drawing in accordance with an embodiment of the invention.

While only certain features of the invention have been illustrated and described herein, many modifications and changes will occur to those skilled in the art. For example, although most components are shown in proximity of each other for compactness, one skilled in the art can place various parts of this system at different locations according to availability of the space. FIG. 34 shows an embodiment of the invention, where upper limit sensor 290 and slack sensor 220 are not in proximity of motor 190 and take-up pulley 210. In FIG. 34, a routing pulley 660, integrated in vehicle rear door 130, is used to route line 140 from slack sensor 220 to take-up pulley 210. One can use variety of mechanisms to route line 140. In another example, FIG. 35 shows an embodiment of the invention where the operator input sensor 340 is not coupled to end-effector 160, but is coupled to vehicle 120. It is, therefore, to be understood that the appended claims are intended to cover all such modifications and changes as fall within the true spirit of the invention.

The invention claimed is:

1. A vehicle, configured to transport an object, said vehicle among other components, comprising:
   a load bearing member;
   a line;
   an actuator coupled to said vehicle and adapted for applying a tensile force to said line in response to an actuator command, and disposed and adapted for transmitting at least a portion of said tensile force to said load bearing member;
   an end-effector mechanically coupled to said line and adapted for transmitting said tensile force to said object and for generating an operator input signal; and
   a controller adapted for generating said actuator command from said operator input signal such that: a) said end-effector moves as a function of said operator input signal when an operator input signal is generated, and b) said end-effector automatically moves upwardly when said operator releases said end-effector.

2. The vehicle of claim 1 wherein said vehicle is a sport utility vehicle.

3. The vehicle of claim 1 wherein said vehicle is a minivan.

4. The vehicle of claim 1 wherein said vehicle is a truck.

5. The vehicle of claim 1 wherein said vehicle is a bus.

6. The vehicle of claim 1 wherein said load bearing member is the vehicle rear door.

7. The vehicle of claim 1 wherein said load bearing member is the vehicle ceiling.

8. The vehicle of claim 1 wherein said load bearing member is the vehicle roof.

9. The vehicle of claim 1 wherein said line comprises an element or combination of elements selected from a group consisting of rope, wire, cable, belts, synthetic rope, fabric rope, plastic rope, wire rope, cord, twine, chain, bicycle-type chain, and string.

10. The vehicle of claim 1 wherein said end-effector is adapted for wirelessly transmitting said operator input signal to controller.

11. The vehicle of claim 1 wherein said actuator comprises:
    a motor adapted for generating a motor torque in response to said actuator command; and
    a take-up pulley adapted for receiving said motor torque and applying a tensile force to said line.

12. The vehicle of claim 11 wherein said motor comprises an element or combination of elements selected from a group consisting of electric motors, hydraulic motors, and pneumatic motors.

13. The vehicle of claim 11 wherein said take-up pulley comprises an element or combination of elements selected from a group consisting of drums, winches, single- groove pulleys, and multi-groove pulleys.

14. The vehicle of claim 11 further comprising a transmission mechanically coupled between said motor and said take-up pulley.

15. The vehicle of claim 14 wherein said transmission comprises an element or combination of elements selected from a group consisting of gear trains, worm gears, bevel gears, planetary gears, pulleys, lines, belts, toothed belts, toothed pulleys, and harmonic drives.

16. The vehicle of claim 1 wherein said actuator further comprises a lower limit sensor adapted for generating a lower limit signal when said end-effector reaches a prescribed lower limit position, said controller being further adapted for generating said actuator command from said lower limit signal.

17. The vehicle of claim 16 wherein said lower limit sensor comprises an element or combination of elements selected from a group consisting of switches and sensors or pick-ups capable of sensing the proximity of said line by magnetic, electrical, or optical means or combinations thereof.

18. The vehicle of claim 16 wherein said lower limit sensor comprises a limit switch.

19. The vehicle of claim 1 wherein said actuator further comprises a slack sensor adapted for generating a slack signal when said line becomes slack and, optionally, for redirecting line, said controller being further adapted for generating said actuator command from said slack signal.

20. The vehicle of claim 19 wherein said slack sensor further comprises:
    a base block;
    an upper assembly rotatably coupled to said base block and adapted for rotating with respect to said base block as a function of line tension in said line;
    a line guide rotatably coupled to said upper assembly and adapted for redirecting line;
    a bias spring mechanically coupled between said upper assembly and said base block and adapted for exerting a bias force on said upper assembly; and
    a load sensor adapted for generating said slack signal when said line tension is insufficient to overcome said bias force.

21. The vehicle of claim 20 wherein said load sensor is mechanically coupled to said upper assembly.

22. The vehicle of claim 20 wherein said load sensor is mechanically coupled to said base block.

23. The vehicle of claim 20 wherein said load sensor comprises a limit switch.

24. The vehicle of claim 20 wherein said load sensor comprises an element or combination of elements selected from a group consisting of switches and sensors or pick-ups capable of sensing the proximity of upper assembly to base block by magnetic, electrical, or optical means or combinations thereof.

25. The vehicle of claim 20 wherein said line guide comprises an element or combination of elements selected from a group consisting of pulleys, sprockets, dowels, sleeves, and channels.

26. The vehicle of claim 1 wherein said actuator further comprises an upper limit sensor adapted for generating an upper limit signal when said end-effector reaches a prescribed upper limit position, said controller being further adapted for generating said actuator command from said upper limit signal.

27. The vehicle of claim 26 wherein said upper limit sensor further comprises:
   an upper limit marker mechanically coupled to said line; and
   a marker detector adapted for generating said upper limit signal when said upper limit marker reaches said prescribed upper limit position.

28. The vehicle of claim 27 wherein said upper limit marker comprises a rubber object.

29. The vehicle of claim 27 wherein said marker detector comprises an element or combination of elements selected from a group consisting of switches and sensors or pick-ups capable of sensing the proximity of said upper limit marker by magnetic, electrical, or optical means or combinations thereof.

30. The vehicle of claim 27 wherein said marker detector comprises:
   an upper limit bracket, said line passing through an opening in said upper limit bracket, said opening being shaped to prevent passage therethrough of said upper limit marker; and
   a contact sensor adapted for generating said upper limit signal as a function of a contact force between said upper limit marker and said upper limit bracket.

31. The vehicle of claim 30 wherein:
   said marker detector further comprises a base block,
   said upper limit bracket being rotatably coupled to said base block; and
   said contact sensor comprises a limit switch adapted for generating said upper limit signal when said contact force causes sufficient rotation of said upper limit bracket with respect to said base block.

32. The vehicle of claim 1 wherein said end-effector comprises:
   an end-effector frame mechanically coupled to said line;
   a cargo interface mechanically coupled to said end-effector frame and adapted for transmitting said tensile force to said object; and
   an operator input sensor mechanically coupled to said end-effector frame and adapted for generating said operator input signal.

33. The vehicle of claim 32 wherein said operator input sensor is an electrical switch.

34. The vehicle of claim 32 wherein a handle mechanically coupled to said operator input sensor and adapted to be grasped by said operator hand.

35. The vehicle of claim 32 wherein said operator input sensor comprises an element or combination of elements selected from a group consisting of piezoelectric force sensors, metallic strain gage force sensors, semiconductor strain gage force sensors, Wheatstone bridge-deposited strain gage force sensors, and force sensing resistors.

36. The vehicle of claim 32 wherein said cargo interface comprises an element or combination of elements selected from a group consisting of hooks, suction cups, magnets, and grippers.

37. The vehicle of claim 32 wherein said operator input sensor comprises:
   a handle;
   a compliant element disposed between said handle and said end-effector frame; and
   a handle displacement sensor adapted for sensing a deformation of said compliant element, said operator input signal being a function of said deformation.

38. The vehicle of claim 37 wherein said compliant element comprises at least one compression spring.

39. The vehicle of claim 37 wherein said handle displacement sensor comprises an element or combination of elements selected from a group consisting of linear potentiometers, magnetic linear encoders, optical linear encoders, linear variable differential transformers, capacitive displacement sensors, eddy current proximity sensors, variable-inductance proximity sensor, and rocker switches.

40. The vehicle of claim 37 wherein:
   said end-effector frame comprises a spline shaft; and
   said handle comprises a ball nut adapted for coupling said spline shaft.

41. The vehicle of claim 37 wherein said handle further comprises a handle switch adapted for generating a handle switch signal when said handle is grasped, said controller being further adapted for holding said actuator stationary when said handle switch is not grasped.

42. The vehicle of claim 1 wherein said controller comprises:
   a signal processor adapted for generating an amplifier command signal from said operator input signal; and
   a power system adapted for generating said actuator command from said amplifier command signal.

43. The vehicle of claim 42 wherein signal processor comprises an element or combination of elements selected from a group consisting of analog devices; analog computation modules; digital devices including, without limitation, small-, medium-, and large-scale integrated circuits, application specific integrated circuits (ASICs), programmable gate arrays (PGAs), and programmable logic arrays (PLAs); and digital computation modules including, without limitation, microcomputers, microprocessors, microcontrollers, and programmable logic controllers (PLCs).

44. The vehicle of claim 42 wherein signal processor comprises an element or combination of elements selected from a group consisting of electromechanical relays or MOSFET switches.

45. The vehicle of claim 42 wherein signal processor generates amplifier command signal from any signal or combination of signals generated by upper limit sensor, lower limit sensor, slack sensor and operator input sensor.

46. The vehicle of claim 42 wherein said power system comprises a power amplifier to generate said actuator command from said amplifier command signal.

47. The vehicle of claim 16 where said controller implements a method wherein said end-effector is stopped when said lower limit sensor is activated and said operator input signal does not indicate an operator intention for raising said end-effector.

48. The vehicle of claim 26 where said controller implements a method wherein said end-effector is stopped when upper limit sensor is activated and the operator input signal does not indicate an operator intention for lowering end-effector.

49. The vehicle of claim 19 where controller implements a method wherein said end-effector is stopped when slack sensor is activated and the operator input signal does not indicate an operator intention for raising end-effector.

50. The vehicle of claim 6 further comprising a holding system wherein said holding system, when said vehicle rear door moves to said open position, securely holds said vehicle rear door in said open position against at least a portion of said tensile force.

51. The vehicle of claim 50 further comprising a release actuator wherein said release actuator, when activated, enables said holding system to let said vehicle rear door move out of said open position.

52. The vehicle of claim 51 wherein said release actuator comprises an element or combination of elements selected from a group consisting of solenoids, linear motors, rotary motors, and combinations thereof.

53. The vehicle of claim 51 further comprising an operator release device which issues an operator release signal when activated by the operator.

54. The vehicle of claim 53 wherein said operator release device comprises an element or combination of elements selected from a group consisting of push buttons, pull buttons, switches, levers, pull handles, buttons, keys, knobs and switches.

55. The vehicle of claim 53 wherein said release actuator is activated and enables said holding system to let said vehicle rear door move out of said open position when said operator release device is activated.

56. The vehicle of claim 53 wherein said release actuator is activated and enables said holding system to let said vehicle rear door move out of said open position when said operator release device is activated and no object is coupled to said line.

57. The vehicle of claim 53 wherein said release actuator is activated and enables said holding system to let said vehicle rear door move out of said open position when said operator release device is activated, no object is coupled to said line and said line has reached its said upper limit position.

58. The vehicle of claim 1 wherein said vehicle comprises at least one motion guide adapted for guiding the motion of said line with respect to said load bearing member.

59. The vehicle of claim 58 wherein said motion guide comprises a rod bearing.

60. A vehicle, among other components, comprising:
  a rear door rotatably coupled to said vehicle and having an open position where inside said vehicle can be accessed;
  a line movably coupled to said rear door;
  an actuator coupled to said vehicle and adapted for applying a tensile force to said line in response to an actuator command;
  a holding system wherein said holding system securely holds said rear door in an open position against at least a portion of said tensile force when said rear door is in said open position;
  an end-effector coupled to said line and adapted for transmitting said tensile force to an object and for generating an operator input signal; and
  a controller adapted for generating said actuator command from said operator input signal wherein said end-effector moves as a function of said operator input signal when said operator is causing said end-effector to generate said input signal and automatically moves upwardly when said operator releases said end-effector.

61. The vehicle of claim 60 wherein said vehicle further comprises a lower limit sensor adapted for generating a lower limit signal when said end-effector reaches a prescribed lower limit position, said controller being further adapted for generating said actuator command from said lower limit signal.

62. The vehicle of claim 60 wherein said vehicle further comprises a slack sensor adapted for generating a slack signal when said line becomes slack and, optionally, for redirecting line, said controller being further adapted for generating said actuator command from said slack signal.

63. The vehicle of claim 60 wherein said vehicle further comprises an upper limit sensor adapted for generating an upper limit signal when said end-effector reaches a prescribed upper limit position, said controller being further adapted for generating said actuator command from said upper limit signal.

64. An apparatus for loading an object into a vehicle, said apparatus comprising:
  a line;
  an actuator coupled to said vehicle and adapted for applying a tensile force to said line in response to an actuator command, and disposed and adapted for transmitting at least a portion of said tensile force to said vehicle;
  an end-effector mechanically coupled to said line and adapted for transmitting said tensile force to said object and for generating an operator input signal; and
  a controller adapted for generating said actuator command from said operator input signal such that: a) said end-effector moves as a function of said operator input signal when said operator is causing said end-effector to generate input signal and b) said end-effector automatically moves upwardly when said operator is not grasping said end-effector and there is no object on said end-effector.

65. An object handling device for loading an object into a vehicle, comprising:
  an end-effector movably coupled to said vehicle and connectable to an object wherein said end-effector includes a handle to be held by an operator and generates an operator input signal;
  an actuator configurable to be coupled to said vehicle and adapted to move said end-effector; and
  a controller controlling the operation of said actuator;
  wherein said controller controls said actuator to lift and lower said object as a function of said operator input signal, and to automatically move said end-effector upwardly when said operator is releasing said end-effector and no object is connoted to said end-effector.

* * * * *